US007361728B1

(12) United States Patent
Elliott et al.

(10) Patent No.: US 7,361,728 B1
(45) Date of Patent: Apr. 22, 2008

(54) ELECTRICALLY CONDUCTING MATERIALS FROM BRANCHED END-CAPPING INTERMEDIATES

(75) Inventors: Brian J. Elliott, Superior, CO (US); William W. Ellis, Louisville, CO (US); Silvia D. Luebben, Golden, CO (US); Shawn A. Sapp, Westminster, CO (US); Chieh-Hui Chang, Golden, CO (US); Raechelle A. D'Sa, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 23 days.

(21) Appl. No.: 10/957,325

(22) Filed: Sep. 30, 2004

(51) Int. Cl.
C08L 65/00 (2006.01)
C08L 71/00 (2006.01)

(52) U.S. Cl. .................... 528/365; 528/373; 528/403; 528/405; 528/417; 528/419; 528/423; 528/424; 528/425

(58) Field of Classification Search ................ 528/373, 528/365, 403, 405, 417, 419, 423, 424, 425
See application file for complete search history.

(56) References Cited

U.S. PATENT DOCUMENTS

| 3,278,437 | A | 10/1966 | Lyman et al. |
|---|---|---|---|
| 3,652,724 | A | 3/1972 | Shimomura et al. |
| 3,673,272 | A | 6/1972 | Dean |
| 3,725,505 | A | 4/1973 | O'Malley |
| 3,816,314 | A | 6/1974 | Pappas et al. |
| 3,907,929 | A | 9/1975 | Guilbault et al. |
| 3,993,712 | A | 11/1976 | Guilbault et al. |
| 4,554,093 | A | 11/1985 | Aldissi et al. |
| 4,608,129 | A | 8/1986 | Tamamura et al. |
| 4,707,527 | A | 11/1987 | Druy et al. |
| 4,900,782 | A | 2/1990 | Han et al. |
| 4,935,164 | A | 6/1990 | Wessling et al. |
| 4,959,430 | A | 9/1990 | Jonas et al. |
| 4,985,124 | A | 1/1991 | Claussen et al. |
| 4,987,042 | A | 1/1991 | Jonas et al. |
| 5,035,926 | A | 7/1991 | Jonas et al. |
| 5,071,524 | A | 12/1991 | Claussen et al. |
| 5,095,076 | A | 3/1992 | Clement et al. |
| 5,227,092 | A | 7/1993 | Han |
| 5,232,631 | A | 8/1993 | Cao et al. |
| 5,254,633 | A | 10/1993 | Han et al. |
| 5,300,575 | A | 4/1994 | Jonas et al. |
| 5,498,761 | A | 3/1996 | Wessling et al. |
| 5,549,851 | A | 8/1996 | Fukushima et al. |
| 5,552,216 | A | 9/1996 | Sugimoto et al. |
| 5,567,355 | A | 10/1996 | Wessling et al. |
| 5,571,454 | A | 11/1996 | Chen et al. |
| 5,589,108 | A | 12/1996 | Shimizu et al. |
| 5,589,565 | A | 12/1996 | Wudl et al. |
| 5,616,669 | A | 4/1997 | Jin et al. |
| 5,635,563 | A | 6/1997 | Oka |
| 5,670,607 | A | 9/1997 | Chen |
| 5,728,321 | A | 3/1998 | Abe et al. |
| 5,759,637 | A | 6/1998 | Angelopoulos et al. |
| 5,792,558 | A | 8/1998 | Jonas et al. |
| 5,795,942 | A | 8/1998 | Rhee et al. |
| 5,837,859 | A | 11/1998 | Teoule et al. |
| 5,843,741 | A | 12/1998 | Wong et al. |
| 5,863,981 | A | 12/1998 | Wong et al. |
| 5,866,043 | A | 2/1999 | Ikkala et al. |
| 5,871,671 | A | 2/1999 | Kinlen et al. |
| 5,908,898 | A | 6/1999 | Wan-Cheng et al. |
| 5,917,693 | A | 6/1999 | Kono et al. |
| 5,929,172 | A | 7/1999 | Zajaczkowski |
| 5,932,144 | A | 8/1999 | Shimizu et al. |
| 5,958,301 | A | 9/1999 | Angelopoulos et al. |
| 5,968,417 | A | 10/1999 | Viswanathan |
| 5,976,418 | A | 11/1999 | Fuller et al. |
| 5,980,784 | A | 11/1999 | Shimizu et al. |
| 5,993,694 | A | 11/1999 | Ito et al. |
| 5,993,696 | A | 11/1999 | Hanhi et al. |
| 5,994,498 | A | 11/1999 | Tripathy et al. |
| 6,004,483 | A | 12/1999 | Jonas et al. |
| 6,010,645 | A | 1/2000 | Angelopoulos et al. |
| 6,025,462 | A | 2/2000 | Wang et al. |
| 6,095,148 | A | 8/2000 | Shastri et al. |
| 6,099,757 | A | 8/2000 | Kulkarni |
| 6,103,145 | A | 8/2000 | Angelopoulos et al. |
| 6,107,439 | A | 8/2000 | Yanus et al. |
| 6,602,974 | B1 | 8/2003 | McCullough et al. |
| 2003/0088032 | A1 | 5/2003 | Luebben et al. |
| 2006/0134006 | A1* | 6/2006 | Tester et al. ................. 424/45 |
| 2007/0059428 | A1* | 3/2007 | Chigurupati ................ 426/648 |

FOREIGN PATENT DOCUMENTS

EP 440957 3/1996

(Continued)

OTHER PUBLICATIONS

Aime, J.P. (1991) "Structural Characterization of Conjugated Polymer Solutions," In; *Conjugated Polymers*, Bredas et al. eds., Kluwer Academic Publishers, pp. 259-267.

(Continued)

*Primary Examiner*—Jeffrey Mullis
(74) *Attorney, Agent, or Firm*—Greenlee, Winner and Sullivan P.C.

(57) ABSTRACT

The present invention relates to a class of conducting oligomers and polymers and to a method for the preparation of the same. The conducting oligomers and polymers contain an end-capping group, which is non-electrically conductive and contains at least one branch point. The branched end-capping groups are made by a method that first substitutes the branched group on the heteroaromatic monomer, particularly at the "2" position on these monomers. In a second step, the end-capping intermediate is co-polymerized with one or more additional heteroaromatic monomers to form capped conducting oligomers and polymers.

26 Claims, 2 Drawing Sheets

FOREIGN PATENT DOCUMENTS

| | | |
|---|---|---|
| JP | 06 256509 | 9/1994 |
| WO | WO 97/04464 | 2/1997 |
| WO | WO 97/16545 | 5/1997 |
| WO | WO 99/16084 | 4/1999 |
| WO | WO 99/19391 | 4/1999 |
| WO | WO 00/24816 | 5/2000 |
| WO | WO 03/018648 | 3/2003 |

OTHER PUBLICATIONS

Biran, C. (2002) "Mechanical Properties of Conducting H-Type Polysiloxane-Polypyrrole Graft Copolymers and Polytetrahydrofuran-Polypyrrole Block Copolymers," *J. Appl. Polym. Sci.* 86:1663-1666.

Bozkurt et al. (2002) "Conduction Mechanism in H-Type Polysiloxane-Polypyrrole Block Copolymers" *J. Appl. Polym. Sci.* 85:52-56.

Carey et al. (1990) *Advanced Organic Chemistry*, Third Ed., Part A, Plenum Press, New York, pp. 531-532.

Chandrasekhar, P. (1999) *Conducting Polymers, Fundamental and Applications*, Kluwer Academic Publishers, Boston,pp. 3-22 and 277-287.

Cho et al. (pub. after Sep. 24, 2003) "Intra-Molecular Energy Transfer Characteristics of Novel Oligo(thienylphenyl)amine Derivatives Having a Gradient Structure," *Macromol. Chem. Phys.* 204:2175-2182.

Francois et al. (1993) "Polystyrene—Polythiophene Block Copolymers (PS-PT) Synthesis, Characterization and Doping," *Synthetic Metals* 55-57:3489-3494.

Francois et al. (1995) "Block-Copolymers with Conjugated Segments: Synthesis and Structural Characterization," *Synthetic Metals* 69:463-466.

Freedman et al. (1975) "An Improved Williamson Ether Synthesis Using Phase Transfer Catalysis," *Tetrahedron Lett.* No. 38:3251-3254.

Fujitsuka et al. (2003, published on Web Dec. 2002) "Photoexcitation and Electron Transfer Properties of Rod- and Coil-Type Oligo(thienylene-ethynylene)s," *J. Phys. Chem. B* 107:739-746.

Groenendaal et al. (2000) "Poly(3,4-ethylenedioxythiopene) and Its Derivatives: Past, Present, and Future," *Adv. Mat.* 12:481-494.

Gumbs, R.W. (1997) "Polythiophene and Polypryrrole Copolymers," In; *Handbook of Organic Conductive Molecules and Polymers*, Singh Nalwa, H. Eds., John Wiley & Sons, pp. 469-504.

Heywang and Jonas (1992) "Poly(alkylenedioxythiophene)s—New, Very Stable Conducting Polymers," *Adv. Mater.* 4:116-118.

Hopkins et al. (1996) "Characterization of Solution and Solid State Properties of Undoped and Doped Polyanilines Processed from Hexafluoro-2-Propanol," *Macromol.* 29:7838-7846.

Jin et al. (2000) "Electrochemical Copolymerization of Pyrrole and Styrene," *Macromol.* 33:4805-4808.

Jin et al. (pub. in or before Aug. 2004) "Main Chain Perfluorocyclobutyl (PFCB) Liquid Crystalline Polymers with Oligo-*P*-Phenylene Vertebrae," *Polymer Preprints* 45(2):91-92.

de Jong et al. (Apr. 2003) "The Electronic Structure of *n*- and *p*-doped phenyl-capped 3,4-ethylenedioxythiophene Trimer," *J. Chem. Phys.* 118(14):6495-6502.

Keegstra et al. (1992) "Copper (I) Halide Catalysed Synthesis of Alkyl Aryl and Alkyl Heteroaryl Ethers," *Tetrahedron* 48:3633-3652.

Kiebooms et al. (1997) "Thermal and Electromagnetic Behavior of Doped Poly(3,4-ethylenedioxythiophene) Films," *J. Phys. Chem. B* 101:11037-11039.

Kinlen et al. (1999) "Synthesis and Characterization or Organically Soluble Polyaniline and Polyaniline Block Copolymers," *Synthetic Metals* 101:758-761.

Lazzaroni et al. (1999) "Microstructure of Block Copolymers Containing a Conjugated Segment, as Studied with Atomic Force Microscopy," *Synthetic Metals* 102:1279-1282.

Leclere et al. (2000) "Highly Regular Organization of Conjugated Polymer Chains via Block Copolymer Self-Assembly," *Adv. Mater.* 12(14):1042-1046.

Lee et al. (2001) "Supramolecular Structures from Rod-Coil Block Copolymers," *Chem. Rev.* 101:3869-3892.

Lefebvre et al. (1999) "Chemical Synthesis, Characterization, and Electrochemical Studies of Poly(3,4-ethylenedioxythiophene)/Poly(styrene-4-sulfonate) Composites," *Chem. Mater.* 11:262-268.

Leung et al. (1993) "Synthesis and Electrical Properties of Polyacetylene Copolymers from Poly(phenyl vinyl sulfoxide) and its Oxidized Products," *Macromol.* 26:4426-4436.

Li et al. (1989) "Synthesis and Characterization of Soluble Polyaniline," *Synthetic Metals* 29:E329-E336.

Li and Wang (Jan. 2004) "Synthesis and Solution Aggregation of Polystyrene-Oligo(*p*-phenyleneethynylene)-Polystyrene Triblock Copolymer," *Macromol.* 37:1172-1174.

McCullough, R.D. (1998) "The Chemistry of Conducting Polythiophenes," *Adv. Mater.* 10:93-116.

Mohanakrishnan et al. (1999) "Functionalization of 3,4-Ethylenedioxythiophene," *Tetrahedron* 55:11745-11754.

Naarmann et al. (1988) "Synthesis of New Electronically Conducting Polymers," In; *Electroresponsive Molecular and Polymeric Systems*, vol. 1, Skotheim, T.A. Ed., Marcel Dekker, Inc., New York and Basel, pp. 1-39.

Odian, G. (1991) *Principles of Polymerization*, 3$^{rd}$ Edition, John Wiley & Sons, Inc., pp. 1.

Rajappa, S. (1984) "Thiophenes and Their Benzoderivatives: (ii) Reactivity," In; *Comprehensive Heterocyclic Chemistry*, Bird et al. ed., Pergamon Press, Oxford, pp. 771-773.

Rivers et al. (Jan. 2002) "Synthesis of a Novel, Biodegradable Electrically Conducting Polymer for Biomedical Applications," *Adv. Funct. Mat.* 12(1):33-37.

Ustamehmetoglu. B. (2001) "Soluble Polypyrrole Copolymers," *J. Appl. Polym. Sci.* 82:1098-1106.

Van Hutten et al. (1995) "Structure of Thiophene-Based Regioregulator Polymers and Block Copolymers and Its Influence on Luminescence Spectra," *J. Phys. Chem.* 99:3218-3224.

Vogel, A.I. (1998) *Textbook of Practical Organic Chemistry*, 5$^{th}$ edition, reprint Longman, Songapore, pp. 557-559, 583-585.

Wagner et al. (2001) "Rigid-Flexible Alternating Block Copolymers That Contain Poly(*p*-phenylene) Units of Defined Length as the Rigid Blocks," *Macromol.* 34:5740-5743.

Wessling, B. (1998) "Dispersion as the Key to Processing Conducting Polymers," In; *Handbook of Conducting Polymers*, 2$^{nd}$ Ed, Skotheim et al. ed., Marcel Dekker, New York, pp. 471-473.

Zhang et al. (1991) "Electrically Conductive Blocked Copolymer of Polyaniline and Poly(p-phenylene-terephthalamide)," *Synthetic Metals* 41-43:251-254.

\* cited by examiner

ELECTRICALLY CONDUCTING MATERIALS FROM BRANCHED END-CAPPING INTERMEDIATES

STATEMENT REGARDING FEDERALLY SPONSORED RESEARCH

This invention was made, at least in part, with funding from the National Science Foundation Contract No. DMI-0319909 and DMI-0110105. Accordingly, the U.S. government may have certain rights in the invention.

BACKGROUND OF THE INVENTION

Conducting polymers by nature are non-soluble and non-dispersible, which makes processing of the polymers difficult and limits their commercial applications. Poor dispersion and difficult processing are the two fundamental obstacles to the development and commercialization of products made using conducting polymers. This invention relates to the synthesis of conducting oligomers and conducting polymers using end-capping monomers. These end-capping monomers, which contain a chemically branched non-conducting group, promote dispersion and processability. Conducting materials made using these branched chemical intermediates are dispersible in some organic solvents. The end-capping monomers can incorporate additional chemical functionality into the conducting material. For example, by incorporating latent polymerizable groups into the end-capping monomers, the conducting material has the added ability to be chemically crosslinked by a polymerization reaction.

Polymers are macromolecules built up by the linking together of larger numbers of much smaller molecules. The small molecules that combine with each other to form polymer molecules are termed monomers, and the reactions by which they combine are termed polymerizations [*Principles of Polymerization*, 3rd addition, George Odian, John Wiley & Sons, Inc., 1991, pg 1]. Polymers may be made of hundreds to tens of thousands, or more, monomer molecules linked together. In some cases larger molecules are made by combining a small number of monomer molecules together and these compounds are termed oligomers. There is no universally accepted limit to distinguish between molecules termed oligomers and those termed polymers, therefore for the purpose of the present invention oligomers are molecules containing at least 3 and up to 50 monomer molecules and polymers are molecules containing more than 50 monomer molecules.

Intrinsically conducting polymers (ICP) and intrinsically conducting oligomers (ICO) have electrical and optical properties that can be reversibly controlled by changing their oxidation state. Most ICPs and ICOs are conjugated molecules with extended "π" conjugation along the molecular backbone. By chemical or electrochemical oxidation or reduction of the molecular backbone (a process known as "doping"), it is possible to systematically vary the electrical conductivity of these materials from the insulating state to the conducting state. In the doped (conducting) state, ICPs and ICOs consist of rather rigid planar polyionic molecules in which the ionic charges are delocalized over a segment of the molecular backbone. For a p-type conductor "holes" in the valance band of the conjugated material are delocalized, while for an n-type conductor electrons in the conduction band are delocalized. The chains are polycationic when they are doped through oxidation (p-doping) and polyanionic when they are doped through reduction (n-doping). Counter-ions (anions for p-doped polymers and cations for n-doped polymers) are present within the polymeric matrix to compensate for the charges on the polymer. Counter-ions can be organic or inorganic.

Representative ICPs and ICOs include polyacetylene, polyaniline, polypyrrole, polythiophene, poly(phenylenesulfide), poly(para-phenylene), poly(phenylenevinylene), and many others [P. Chandrasekhar, Conducting Polymers, fundamental and Applications, Kluwer Academic Publishers, Boston, 1999]. Because of their extended π conjugation, conducting polymers and oligomer molecules behave like rigid rods, have poor flexibility, and hence do not flow or melt. Therefore, traditional melt processing common in the polymer industry cannot be employed to process these materials. Moreover, because of the strong ionic interactions among polymer chains and counterions, most conducting polymers do not dissolve in either aqueous or organic solvents and, as a result, cannot be processed from solution [Wessling B.; "Dispersion as the key to Processing Conducting Polymers", in Handbook of Conducting Polymers, 2nd Ed.", Ed. T. A. Skotheim, R L Elsenbauer, J. R. Reynolds, (1998), Marcel Dekker, New York, p-471-473]. The poor processability of conducting polymers and oligomers is a major impediment to their commercial use.

A few exotic solvents have been discovered for some conducting polymers or oligomers. For example, polyaniline doped with organic sulfonic acids is soluble in m-cresol or hexafluoroisopropanol solutions. However, these solvents are not preferred for large scale industrial processes due to high cost and toxicity [Rasmussen P., Hopkins A., Basheer R., Macromolecules, 29, (1996) 7838-7846]. Other conducting polymers have been stabilized as dilute dispersions in water. For example, a 1.3% aqueous dispersion of poly(3, 4-ethylenedioxythiophene), termed PEDOT, doped with polystyrene sulfonic acid is commercially available from H.C. Starck and is sold under the trade name of Baytron™ P (Trademark, Bayer AG and H.C. Starck) (L. Groenendaal, F Jonas, D. Freitag, H. Pielartzik, J. Reynolds, Advanced Materials, 12, (2000) 481-494). However, polystyrene sulfonic acid stabilized dispersions of PEDOT are highly acidic, which can cause problems during product manufacturing. Conducting polymers containing long solubilizing side-chains such as poly(3-hexylthiophene) are soluble in their undoped state in common organic solvents, such as chloroform, and can be processed from solution in this undoped stated. A post processing doping is required to transform the polymer to its conducting form. Post-processing doping is often difficult to carry out, is not homogenous throughout the bulk of the material (the surface of the material has usually a higher doping level) and de-doping in likely to occur with time.

Jong et al. reported the preparation and electronic properties of n- and p-doped phenyl-capped 3,4-ethlenedioxythiophene trimers, which are end-capped conducting oligomers [M Jong, A. Denier van der Gon, X. Crispin, W. Osikowicz, W. Salaneck, and L. Groenendaal, Journal of Chemical Physics, vol 118, no. 14, Apr. 8, 2003, pg 6495-6502]. These materials are being investigated for use in field effect transistors and solar cells. Formula 1 illustrates a phenyl-capped EDOT trimer. The phenyl-capped EDOT trimers were synthesized as model compounds to study the chemical doping of PEDOT. The oligomers were first prepared in the non-doped state, vacuum deposited on substrates, then doped by exposure to iodine or lithium vapor.

Formula 1

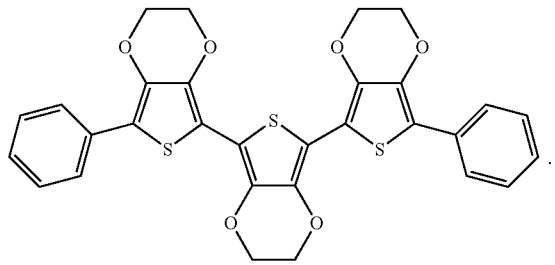

Jin et al., reported the preparation of end-capped poly (para-phenylene) oligomers using a trifluorovinyl ether group as the end-cap [J. Jin, S. Glaser, J. Ballato and D. Smith Jr., Polymer Preprints, 2004, vol 45, no (2), page 91]. These fluorinated end-capping groups improved the processability of the poly(para-phenylene) (PPP) conducting material. Non-doped oligomers were made using from 3 to 5 phenylene monomers and were used as non-conducting, luminescent materials. The trifluorovinyl ether end-cap reduced the melting point of the oligophenylenes compared to the non-end-capped parent compound. For example, the melting point of non-doped PPP trimer (oligomer with three phenylene monomers) is 212° C., while it is 168° C. for the fluorinated end-capped trimer. Formula 2 illustrates the structure of the end-capped pentamer reported by Jin, Glaser et al. Poly(para-phenylene) is not a poly(heteroaromatic) compound.

Formula 3

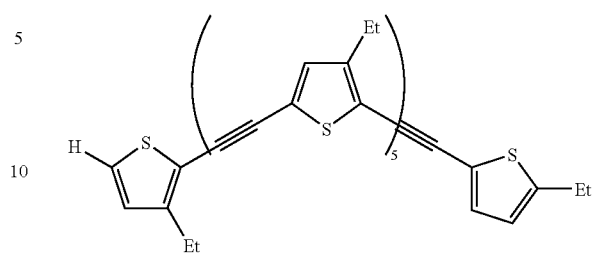

Rivers et al. reported the synthesis of biodegradable conducting polymers for medical applications [T. Rivers, T. Hudson and C. Schmidt, Advanced Functional Materials, January 2002, vol 12, no. 1, page 33]. As part of the synthesis procedure, an end-capped electroactive oligomer was produced (Formula 4). The electroactive oligomer was made from thiophene and pyrrole, and the end-cap contained a biodegradable ester bond and a terminal hydroxyl group. These oligomer intermediates were reacted with a di-acid chloride to form a biodegradable conducting block copolymer. The oligomer intermediate was not doped during the synthesis procedure.

Formula 4

Formula 2

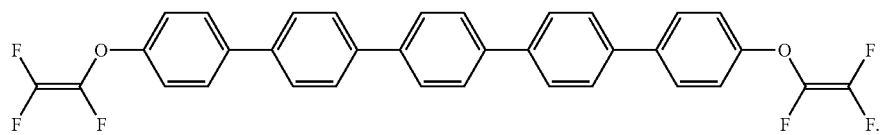

Fujitsuka et al. reported the photoexcitation and electron transfer properties of rod- and coil-type oligo(thienylene-ethynylene)s [M. Fujitsuka, T. Makinoshima, O. Ito, Y. Obara, Y. Aso, and T. Otsubo, Journal of Physical Chemistry B., 2003, Vol 107, pg 739-746]. Oligomers of π-conjugated polymers were synthesized from, among others, 2,5-thienyls, or homo-oligothiophenes. Thiophene monomers were connected with ethynylene groups at the 2 and 5 positions on the thiophene ring. Oligomers with 7 or 11 thiophene rings were produced. Because 2-ethyl thiophene was used as the monomer, the resulting oligomer had one terminal (2-position) end that is end-capped with an ethyl group. The materials produced and reported were not doped, but were used for photoexcitation and electron transfer. Formula 3 is an exemplary oligo(thienylene-ethynylene) end-capped on right.

Cho et al. reported the synthesis and energy transfer characteristics of branched oligo(thienylphenyl)amine compounds [J-S. Cho, Y. Kojima, S, Norifusa, M. Higuchi, K. Yamamoto, Macromol. Chem. Phys. 2003, vol 20, pp 2175-2182]. These molecules have a branched electroactive oligothiophene portion as well as linear hexyl end-caps. The branching only takes place in the oligothiophene region, while the end-caps are linear alkyl groups. None of the compounds described had linear (non-branched) electroactive or conducting segments.

Materials called end-capped conducting oligomers and polymers in the present invention can be classified as triblock copolymers or triblock oligomers, where the ABA triblock structure consists of non-conducting "A" blocks and conducting, or conjugated "B" blocks. Examples of AB diblock copolymers containing a non-conducting "A" block on only one side of the conjugated "B" block are known in the art.

Francois and Olinga reported the preparation of polystyrene-polythiophene (PSt-PTh) copolymers by polymerization of thiophene or 2-bromothiophene and polystyrene precursors terminated with thiophene or 2-bromothiophene groups. Soluble and insoluble fractions were recovered after synthesis. The purified soluble fraction was doped in solution by iron chloride. Doping of the copolymer was quantified by the measuring the optical density of the doping band as a function of the iron chloride loading, but no conductivity data were presented for the copolymer. The copolymer was used to cast films from solution, and these films were then pyrolyzed at 380° C. to de-polymerize the polystyrene. The conductivity of the pyrolyzed films containing only the polythiophene was up to 60 S/cm (B. Francois, T. Olinga, Synthetic Metals, 55-57 (1993) 3489-3494). Francois et al. also described the synthesis of poly (para-phenylene) (PPP), polythiophene (PTh), and poly(3-hexylthiophene) block copolymers with polystyrene (PSt) or polymethylmethacrylate (PMMA) by a similar method. Although they stated that "$FeCl_3$ doped PSt-PPP copolymers" formed "exceptionally regular porous and conducting membranes", no conductivity data were reported [B. Francois, G. Widawski, M. Rawiso, B Cesar, Synthetic Metals, 69 (1995) 463-466][B. Francois, R Lazzaroni, Ph. Leclere., V. Parente, A. Couturiaux, J. Bredas, Synthetic Metals, 102 (1999) 1279-1282]. These conducting materials produced by the methods described by Francois and Olinga and Francois et al. do not produce end-capped conducting oligomers (where the non-conducting end-caps are on both ends of the oligomer as defined later) or conducting ABA-type block copolymers (where "B" is the conducting polymer segment).

Jin, Liu et al. reported the electrochemical copolymerization of pyrrole and styrene in nitromethane at different feed ratios. The formation of di-block copolymers was reported. The products deposited as insoluble films at the electrode during synthesis, and were insoluble in both nitromethane and dichloromethane. Conductivities ranging from 0.2 to 0.007 S/cm were reported [S. Jin, X. Liu, W. Zhang Y. Lu, G. Xue, Macromolecules, 33, (2000) 4805-4808].

Van Hutten et al. reported the synthesis of block copolymers by regularly alternating a block of oligothiophene with a block of oligosilanylene. The oligothiophene blocks with a specific and definite number of monomer units (thiophene) were first prepared using organometallic chemistry (Ni-catalyzed Grignard coupling of mono- or di-bromothiophenes, or by oxidative coupling of lithiated thiophenes). The oligothiophene blocks, which were not end-capped, were then joined with thiophene terminated silanylene blocks [G. Hadziioannou, P. Hutten, R. Gill, J. Herrema; J. Phys. Chem., 99, (1995) 3218-3224]. Van Hutten et al. report using the silanylene group to limit the conjugation length of conducting polymer segments as a method of controlling the luminescence wavelength. The materials reported were not ABA-type block copolymers.

Leung and Ho Tan reported the synthesis of polystyrene-polyacetylene di-block copolymers produced by thermal elimination of polystyrene-poly(phenylvinylsulfoxide) di-block copolymers. Conductivity of the copolymers versus compositions was reported [L. Leung, K Ho Tan, Macromolecules, 26, (1993) pp. 4426]. Polyacetylene is a conducting polymer but not a poly(heteroaromatic) polymer.

Goodson et al. reported the synthesis of rigid-flexible alternating block copolymers of poly(para-phenylene) and poly(ethylene glycol). The copolymers were characterized by thermogravimetric analysis, differential scanning calorimetry and fluorescence spectroscopy, but no conductivity data were reported [F. Goodson, Z Wagner, T Roenigk, Macromolecules, 34, (2001) 5740-5743]. Goodson et al. report the formation of soluble block copolymers when the PPP segment is less than 6 repeat units long. Although Goodson and others report the formation of block copolymers of PPP that exhibit flourescence behavior, they do not report the formation of conducting materials, or materials that can be rendered conducting by doping. Also, no methods for end-capping conducting oligomers or polymers are reported.

Cao et al. reported the synthesis of ABA block copolymers of polyaniline ("A") with poly(ethyleneglycol) ("B") prepared by oxidative co-polymerization of aniline with poly(ethyleneglycol) segments that had previously been reacted with p-aminobenzensulfonyl chloride. The products were reported to be soluble in DMF, DMSO, and THF in the neutral state, but only slightly soluble in the protonated (doped) state. Conductivity of cast films ranged from 0.62 to $1.7 \times 10^{-4}$ S/cm [Y. Cao, S. Li, H. Dong, Synthetic Metals, 29, (1989) E329-E336]. The structure of these triblock copolymers is in contrast to the materials of the present invention, in which the "B" block is conducting, or conjugated and the "A" blocks, or end-caps are non-conducting.

Zhang and Bi report the synthesis of polyaniline-poly (phenylene-terephthalamide)-polyaniline tri-block copolymers using an —COCl (acid chloride) end-capped oligomer of poly(phenylene-terephthalamide), and reacting with low molecular weight polyaniline, previously prepared by oxidative polymerization of aniline in HCl solution [G Zhang, X. Bi, Synthetic Metals, 41-43, (1991) 251-254]. In this case the oligo(phenylene-terephtalamide) is end-capped with —COCl groups. The ABA-type block copolymer formed has both conducting "A" and "B" blocks. Also, the "A" blocks are not branched.

Kinlen et al. report the synthesis of ABA tri-block copolymers where the A blocks are polyaniline and the "B" block is a non-conducting di-amino terminated poly(ethyleneoxide), poly(propyleneoxide), poly(dimethylsiloxane), or poly (acrylonitrile-co-butadiene). Polymerization was performed in emulsion by oxidative coupling of aniline and the di-amino terminated "B" block in the presence of dinonylnaphthalene sulfonic acid. Moderately conducting ($10^{-5}$ S/cm) high molecular weight soluble copolymers were reported [P. Kinlen, B. Frushour, Y. Ding and V. Menon, Synthetic Metals, 101, (1999) 758-761]. These triblock copolymer materials contain a non-conducting "B" block and conducting "A" blocks, which is opposite to the materials of the present invention.

Kinlen et al. (WO99/16084) report the synthesis of diblock AB and triblock ABA copolymers containing intrinsically conducting blocks "A" and a non-conducting block "B." Diblock copolymers have one non-conducting block and one conducting block, while triblock copolymers have one central "B" non-conducting block and two conducting "A" blocks. Although the published PCT application mentions the use of ICP monomers including "pyrrole, substituted pyrroles, . . . thiophenes and substituted thiophenes, indoles, . . . furans, carbazoles and mixture thereof . . . substituted and unsubstituted anilines . . . " the only ICP monomer for which copolymer synthesis is reported is aniline and the only block copolymers exemplified are AB di-block and ABA tri-block copolymers of polyaniline (where the polyaniline block is "A"). No methods of preparation are provided in the reference for block copolymers containing blocks of poly(heteroaromatic) polymers such as polypyrrole, polythiophene and their derivatives. This published PCT application does not report methods for forming ABA triblock copolymers where the "B" block is conducting and the "A" blocks are non-conducting, nor does it report the formation of branched conducting copolymers or branched end-capped oligomers.

Luebben et al. report the formation of block copolymers containing at least one block of a poly(heteroaromatic) polymer and at least two blocks of a non-conjugated polymer [S. Luebben, B. Elliott, C. Wilson, United States patent application No. US2003/0088032 A1 (published May 8, 2003) and Published PCT application WO03018648 (published Mar. 6, 2003)]. The ABA-type block copolymers and end-capped oligomers contain "A" blocks or end-caps that are not branched.

McCullough et al. teach a method for forming a triblock copolymer comprising combining a soluble thiophene with an organomagnesium reagent, and in some cases the ends of the polymer contain either an aldehyde, hydroxyl or an atom-transfer-radical-polymerization initiator [McCullough et al. U.S. Pat. No. 6,602,974]. In these cases the end-capping groups on the conducting polymers are linear (not branched) and the 3-alkyl thiophene polymers are not specifically doped. An exemplary hydroxyl terminated 3 alkyl thiophene polymer is given by Formula 5.

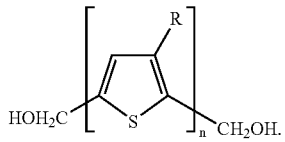

Formula 5

In a review of block copolymers (both conducting and non-conducting materials) by Lee et al. the supramolecular structures formed by rod-coil block copolymers are reported [M. Lee, B-K. Cho, and W—C. Zin, Chemical Reviews 2001, vol 101, pp 3869-3892 and references therein.]. Rod-coil block copolymers are discussed including ABA-type block copolymers in which the "B" block is a rigid conducting polymer. All of the materials described are linear block copolymers, and do not contain branched terminal blocks. Lee et al. discuss methods for manipulating the supramolecular structure of conjugated polymers, by incorporating them into coil-rod-coil copolymers, where the conducting segment is the rigid rod. Specific examples are the synthesis of triblock poly(isoprene-block-para-phenyleneethynylene-block-isoprene), and polystyrene-oligothiophene-polystyrene. In both cases the ABA-type block copolymers or the end-caped oligomer intermediates do not contain a branched end-cap or "A" block.

In similar work, Li and Wang reported the synthesis and solution aggregation of polystyrene-oligo(para-phenyleneethynylene)-polystyrene ABA-type triblock copolymers, where "B" is a conducting block [K. Li and Q. Wang, Macromolecules, 2004, vol 37, pp 1172-1174]. The authors state that "aggregation and microphase separation of rod-coil block copolymers containing π-conjugated polymers and oligomers have yielded a number of nanoscale morphologies, such as lamellar, spherical, cylindrical, and vesicular structures with tunable optical and electronic properties". Furthermore, "compared to the effort directed at understanding the self-assembly of rod-coil di-block copolymers, triblock copolymers containing conjugated moieties are much less studied". They reported coil-rod-coil triblock copolymers consisting of oligo(-para-phenyleneethynylene) and "found that this triblock copolymer exhibits unique solvatochromatic behavior through aggregation-induced π-π stacking and planarization of the conjugated backbone". In these experiments the ethynylene units are not heteroaromatic groups and the "coil" or "A" blocks are not branched.

There is a significant and continuing need in the art for conducting polymers and conducting oligomers that exhibit improved processability, optical properties, and physical properties. There is a specific need in the art for processable conducting oligomers and conducting polymers formed from heteroaromatic monomers.

SUMMARY OF THE INVENTION

This invention provides new materials, and methods for making these materials, which are conducting oligomers and conducting polymers. The conducting oligomers and polymers are formed by co-polymerization of one or more heteroaromatic monomers with one or more specific end-capping monomers that are produced from a branched end-capping precursor. The invention specifically provides branched and hyperbranched end-capping monomers for preparation of conducting oligomers and polymers as well as the conducting oligomers and polymers that are produced using the branched and hyperbranched end-capping monomers. The invention further provides new branch-forming alkoxide and related intermediates which are useful for forming certain branched and hyperbranched end-capping monomers. The invention additionally relates to methods of making oligomers, polymers and co-polymers using the new intermediates.

Furthermore, this invention provides new conducting ABA-type block copolymer and conducting oligomer materials that have branched and hyperbranched end-capping groups, which promote dispersibility and improve other physical properties, such as optical transparency and film formation, important in the production of electronic devices.

DETAILED DESCRIPTION OF THE INVENTION

Figure 1:
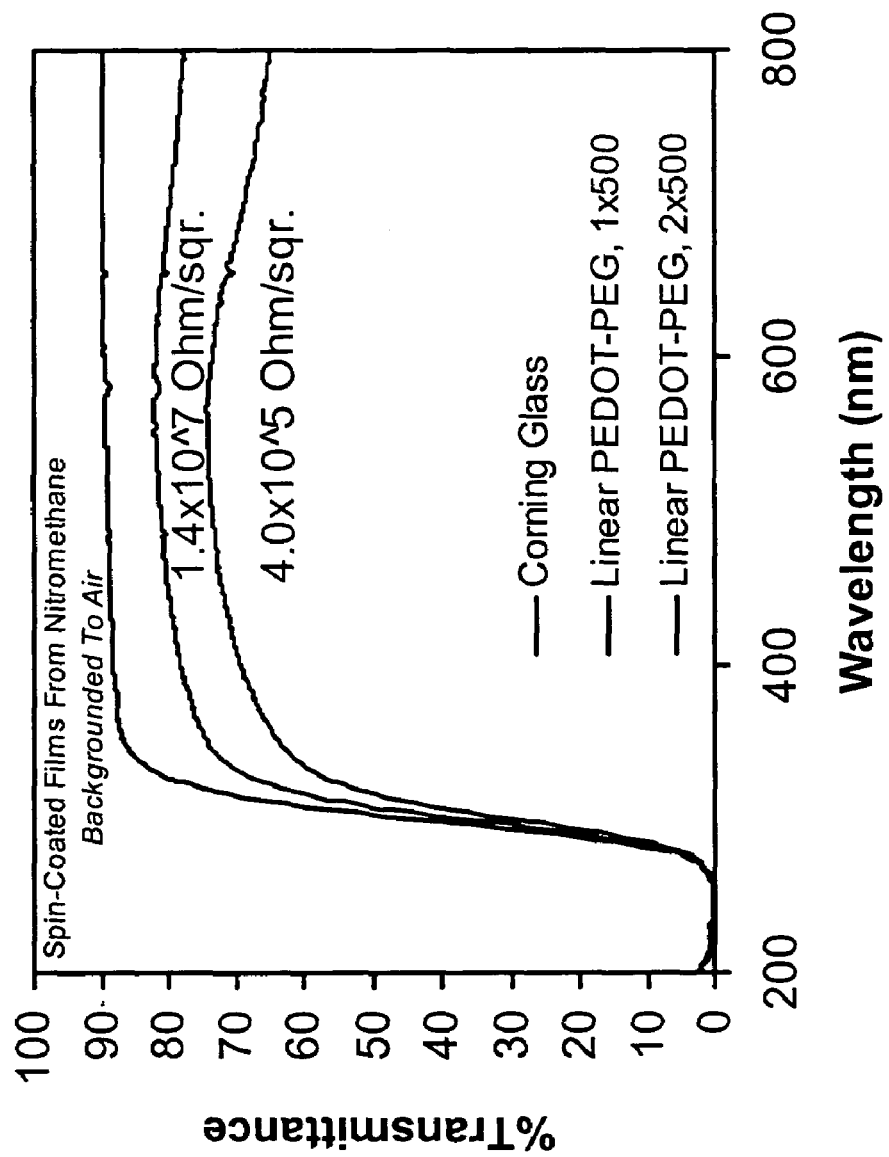
FIG. 1 shows optical clarity and surface resistivity of linear ABA block copolymers (poly(EDOT-block-EG 1098). Polymerization and purification methods described in concurrently filed U.S. patent application Ser. No. 10/954,621 were employed in addition to descriptions herein to produce this material.

This invention provides new polymeric materials, and methods for making these materials, which are end-capped oligomers and ABA triblock copolymers having a center block of an intrinsically conducting polymer (i.e. poly(3,4-ethylenedioxythiophene, PEDOT). These materials are formed by co-polymerization of one or more heteroaromatic monomer/s (for example 3,4-ethylenedioxythiophene-EDOT) with a branched end-capping monomer, for example, a branched EDOT-alkoxide intermediate described in this invention. Details of the copolymerization method are described in United States patent application publication No. US2003/0088032 A1 (Luebben, Elliott, and Wilson) and in concurrently filed U.S. patent application Ser. No. 10/954, 621. Specific improvements of the present invention are chemical compositions and methods for forming a family of end-capped oligomers and triblock copolymer compounds using these new branched end-capping monomer precursors in copolymerization methods as described in US2003/0088032 A1. Additionally, EDOT-alkoxide precursors, and the branched end-capping heteroaromatic monomers in general are new materials.

In specific embodiments, the invention provides end-capped conducting oligomers and ABA triblock conducting copolymers containing branched or hyperbranched end-caps, EDOT-alkoxide compounds useful in polymerizations herein; branched or hyperbranched end-capping heteroaromatic monomers; branched or hyperbranched end-capping heteroaromatic monomers containing one or more latent polymerizable groups; a method for making branched or hyperbranched, end-capped conducting oligomers and ABA triblock conducting copolymers by copolymerization of one or more heteroaromatic monomers and branched or hyperbranched end-caps, a method for making branched and hyperbranched end-capping monomers, a method for making end-capped conducting oligomers and ABA triblock conducting copolymers using branched end-capping heteroaromatic monomers containing one or more latent polymerizable groups and an oxidative polymerization, polymers and copolymers containing the polymerizable, branched or hyperbranched, end-capped oligomers and ABA copolymers with or without additional co-monomers, and methods for producing polymers and copolymers containing the polymerizable, branched or hyperbranched, end-capped oligomers and ABA copolymers.

Methods for forming linear oligomers and linear triblock copolymers by oxidative copolymerization of a heteroaromatic monomer (for example EDOT) and a non-conducting compound or polymer that is terminated with one or two groups that undergo oxidative polymerization (for example a mono-functionalized EDOT "end-capping" precursor) are described in detail in US2003/0088032 A1. In general, the synthesis scheme involves first producing the end-capping precursor (for example a 2-substituted derivative of EDOT), followed by an oxidative copolymerization with a heteroaromatic monomer (for example EDOT). In many cases it is also desirable for the end-capping precursors to have additional functionality added by chemically bonding various molecules that provide a specific utility or function. For example, in certain cases it is desirable to attach molecules that have latent polymerizable groups. "Bi-functional" heteroaromatic monomers (the end-cap precursors which contain the oxidatively polymerizable heteroaromatic group as well as a radical or cationic polymerizable latent group) has been accomplished to provide improved synthetic methods. Additionally, the mono-substituted heteroaromatic monomers are preferably produced in high purity. The synthesis of these asymmetric compounds is particularly difficult when they contain latent polymerizable groups that must survive any chemical reactions used to synthesize the end-cap precursor. Therefore improved methods for producing substituted heteroaromatic end-cap precursors are useful. Also, branched end-capping heteroaromatic monomers can be used to produce branched end-capped oligomers and branched ABA conducting copolymers that have improved properties, including forming dispersions of improved stability and smaller particle size, and forming thin films of improved optical transparency, reduced surface resistance and reduced surface roughness.

The challenge in making the triblock copolymers is to first prepare mono-substituted end groups, which are then used to copolymerize with a heteroaromatic monomer. In principle, the starting ratio of the end-caps to the monomer will determine the chain length of the oligomers that are formed. For instance, reacting 6 eq of EDOT with 1 eq of the end-cap will result in oligomers with a statistical average length of 14 EDOT units. It is expected that longer oligomers will have greater conductivity, at the expense of poorer solubility for a given type of end-cap.

In a first aspect, we report the synthesis of dialkoxide complexes, as exemplified by reaction of lithiated-EDOT with glycidol (Example 1). The reaction is novel because it is unnecessary to protect the alcohol function of glycidol prior to the reaction with the strongly basic lithiated-EDOT. Rather, by using an excess of the base, the alcohol can first be deprotonated, allowing a second equivalent of the base to ring open the epoxide. A second benefit of this approach is that the di-lithium salt is insoluble in the reaction medium (THF and hexanes), allowing an easy isolation and purification of the material by washing. This removed excess EDOT present in the reaction mixture, as well as unwanted side-products. The di-alkoxide is useful as a precursor for the synthesis of numerous end-caps (Examples 2, 3, 4, 14, and 15). It reacts readily with electrophiles. For instance, carboxylic acid chlorides and anhydrides react with the dialkoxide to form diesters (Examples 2, 3 and 4). These diesters can be polymerizable (e.g. methacrylate, Examples 2 and 3) or they can be non-polymerizable (e.g. ethylhexanoyl, Example 4). The alkoxide can also be protonated by reaction with water or an acid to form the corresponding diol (Example 1, NMR analysis). The di-alkoxide can also be used to ring open epoxy compounds (Example 14), to add to activated carbon-carbon double bonds, or to carry out a nucleophilic substitution to a compound containing a suitable leaving group such as a tosylate or an halogen. The dialkoxide can also been used to initiate an oligomerization or polymerization reaction of an opportune monomer. For example the dialkoxide can be used to initiate the homopolymerization of epoxy compounds to form an hyperbranched end-capper in a single step (Example 15). The dialkoxide can also be used to initiate the ionic polymerization of suitable monomers. As indicated below, the dialkoxide and various salts thereof can be prepared using various heteroaromatic monomers. Additionally the epoxide precursor can be varied to provide additional structural variation in the alkoxide as is shown in the formulas herein below.

Co-polymerization of EDOT with the endcaps is mediated by iron(III) para-toluenesulfonate (Examples 5, 6, 7 and 8), iron(III) perchlorate (Example 12), or iron(III) chloride (Example 9). In general a variety of oxidizing agents can be employed in these oxidative polymerizations. Additionally as described in US2003/0088032 A1 copolymerization can be conducted employing various heteroaromatic monomers. Workup of the conducting oligomers is afforded by washing several times with ethanol. Films of the triblock copolymers can be prepared by spin-coating. Patterns can also be prepared by photo-curing of the end-capped conducting oligomers containing latent polymerizable groups (methacrylates) in the presence of additional acrylate monomers and a photo-initiator (Example 11). Also the conducting oligomers that contain methacrylate groups can be further substituted by addition of poly(propyleneoxide-co-ethyleneoxide) monoamines to the methacrylate groups via a Michael-type addition (Example 10). Purification methods involving wet gel formation as described in concurrently filed U.S. application Ser. No. 10/954,621 can be employed with the polymers and copolymers of this invention.

The use of the di-alkoxide intermediates also enables the one-step synthesis of hyperbranched end-cap heteroaromatic monomer-derivatives (e.g., EDOT-derivatives). Branched and hyperbranched structures can be prepared by reacting the dialkoxide with an epoxy compound. Through careful control of the synthetic conditions the dialkoxide can be used to initiate the oligomerization of the epoxy compound with itself and end-cap compounds with in average of 1, 2, 3, 5, 6, and 7 branches have been prepared with this method. Examples 14 and 15 exemplify the synthesis of EDOT end-cap derivatives by ring-opening of epoxy compounds to form a branched derivative and a hyperbranched derivative, respectively. The statistical average number of branch points is determined by 1H-NMR.

These branched and hyperbranched end-caps can be used to prepare end-capped oligomers and ABA tri-block copolymers according to the polymerization method described herein, in US2003/0088032 A1 and in the concurrently filled U.S. application Ser. No. 10/954,621. Scheme 1 exemplifies the synthesis of branched and hyperbranched end-caps using the EDOT-alkoxide and epoxy compounds.

Branched and hyperbranched end-capped oligomers and ABA tri-block copolymers offer substantially improved properties compared to corresponding linear capped oligomers and liner tri-block copolymers. These improvements consist of forming more stable dispersions of smaller particles size and better film-forming properties. Thin films spin-cast from dispersions of hyperbranched end-capped oligomers have better optical transparency, reduced surface resistivity, and lower surface roughness than thin films spin-cast from dispersion of end-capped linear oligomer of similar composition. Furthermore these hyperbranched oligomers require less time for processing into a stable dispersion. Furthermore, certain hyperbranched oligomers form stable dispersion in common organic solvents such as methyl ethyl ketone (Example 20), rather than polar aprotic solvents, such as nitromethane or propylene carbonate.

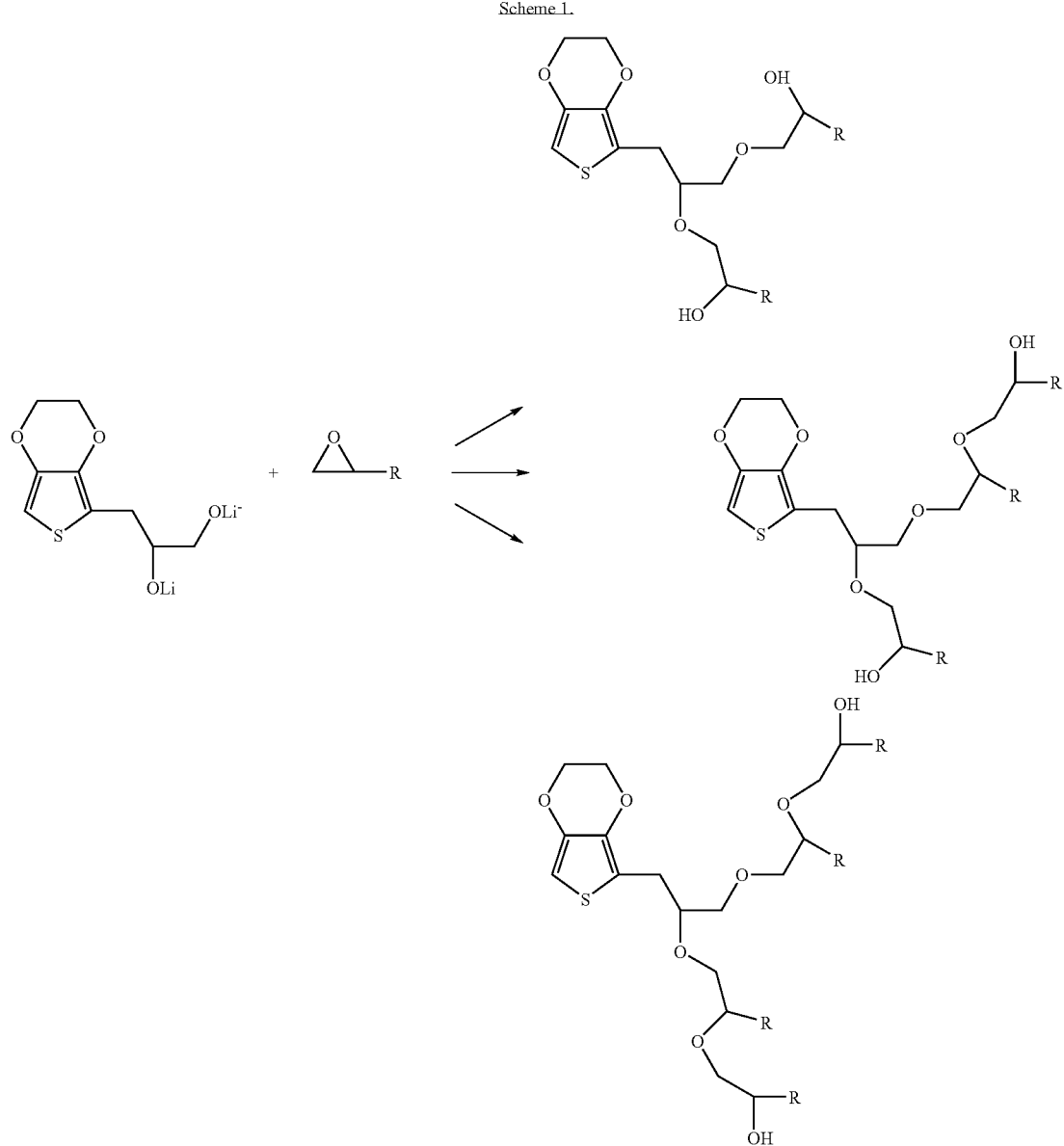

Scheme 1.

For example linear block copolymers of PEDOT and PEG made according to have a number average particle size in the wet state of 1 micron (as determined by light scattering measurements) and in the dry state is 30-40 nm (as determined by measuring the surface roughness of thin films with AFM). FIG. 1 shows that a film obtained by spin casting a single coating at 500 RPM on a Corning glass substrate has an average optical transmittance of 80.3% from 400 to 800 nm (this is the transmittance of the glass plus the poly (EDOT-block-EG 1098) thin film). This film has a surface resistance of $1.4 \times 10^7$ Ohms/square. A thicker film that is obtained by spin casting two coatings at 500 RPM has an average optical transmittance of 70.9% over the entire visible spectrum (400 to 800 nm) and a surface resistance of $4 \times 10^5$ Ohms/square.

Example 19 of the present invention shows that thin films of an hyperbranched oligomer have considerably improved optical and electrical properties: a film that was spin-cast under the same conditions (i.e. at 500 RPM) had an average optical transmittance of 80.1% over the entire visible spectrum (400 to 800 nm) and a surface resistance of $1.4 \times 10^3$ Ohms/square (an improvement of more than two orders of magnitude over the linear material). Furthermore the film made from the hyperbranched oligomer has an average RMS surface roughness of 3.9 nm as determined by contact mode atomic force microscopy (AFM), and that is a reduction of a factor of 10 compared to the surface roughness of our liner copolymers. We believe that the hyperbranched copolymer structure better protects the conducting segments from aggregation in solution by forming more stabilized micelles.

Other methods exist to prepared hyper-branched macromonomers, and are well known in the dendrimer literature.

DEFINITIONS

A "polymer" is a molecule containing more than 50 monomer molecules. "Polymers are maromolecules built up by the linking together of larger numbers of much smaller molecules. The small molecules that combine with each other to form polymer molecules are termed monomers, and the reactions by which they combine are termed polymerizations" [*Principles of Polymerization,* 3rd addition, George Odian, John Wiley & Sons, Inc., 1991, pg 1]. "Polymers may be made of hundreds to tens of thousands, or more, monomer molecules linked together".

In some cases larger molecules are made by combining a small number of monomer molecules together and these compounds are termed oligomers. An "oligomer" is a molecule containing at least 3 and up to 50 monomer molecules.

A "conducting polymer" is a doped or non-doped conjugated polymer that is capable of electronic conductivity when it is in the doped state.

A "chain" is a linear connection of atoms. A linear connection of atoms is illustrated in Formula 6, where the numbers (1, 2, 3 and 4) represent atoms and the lines represent covalent bonds. Additional atoms may be connected to the atoms shown to satisfy valence.

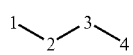

Formula 6

A "branch" or a "branched group" is defined herein to be a chemical structure that contains a "branch point" in which a single atom is covalently bonded to three or more chains of covalently bonded atoms, in which each of these chains contains at least 4 atoms that have valence higher than 1 (i.e. excluding hydrogen, halogens, and alkali metals). This definition of a branch point is used to distinguish over functional groups that are simply pendant from linear chains. In Formula 7, $X_0$ is the single atom of the branch point that is connected to three separate chains of covalently bonded atoms. $X_1$, $X_2$, $X_3$ and $X_4$ are atoms selected from those atoms not including hydrogen, halogen and alkali methals (i.e. carbon, oxygen, nitrogen, sulfur, etc.). A branch may include additional atoms or cyclic structures as long as a linear chain of at least 4 atoms is present.

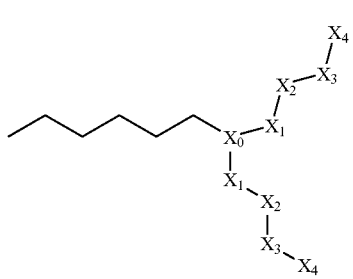

Formula 7

An ABA triblock copolymer is a block copolymer containing two "A" blocks of a non-conjugated non-conducting polymer or oligomer or end-cap and one "B" block of a poly(heteroaromatic) polymer or oligomer, wherein the "A" blocks are linked to the "B" block through covalent bonds.

An "end-cap" or an "end-capping group" or an "end-capper" is a heteroaromatic monomer functionalized in position "2" with a non-conjugated non-conducting group or polymeric segment. The "2" position is defined as either of the carbon atoms adjacent to the heteroatom as shown in Formula 8. If $R_4$ and $R_3$ are different, there are two different "2" positions as indicated by the arrows. If $R_4$ and $R_3$ are the same groups, the both positions indicated are equivalent.

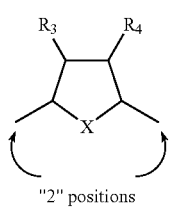

Formula 8

"2" positions

A branched end-cap or end-capping group is a heteroaromatic monomer functionalized in position "2" (as shown in Formula 8) with a group, compound or polymeric segment that contains at least one branch or branch point.

A hyper-branched end-cap or end-capping group is a heteroaromatic monomer functionalized in one of the "2" positions (as shown in Formula 8) with a group, compound or polymeric segment that contains at least two branches or branch points.

A "branched end-capped conducting oligomer" or "branched conducting oligomer" is a conducting oligomer containing a branched end-cap or end capping group at both ends of the conducting oligomer.

A "branched conducting ABA block copolymer" or a "branched conducting copolymer" is an ABA-type block, conducting polymer containing one branched end-cap (as each "A" group) at both ends of a center conducting polymer block.

A "hyperbranched conducting oligomer" is a conducting oligomer that contains an end-cap which has at least two branches.

A "hyperbranched ABA-type conducting triblock copolymer" is a conducting polymer that contains an end cap which has at least two branches.

A heteroaromatic monomer is an aromatic compound containing a heteroatom in the conjugated ring system and is isoelectronic with the original aromatic hydrocarbon [F. Carey, R. Sundberg, *Advanced Organic Chemistry*, Third Ed., Part A, Plenum Press, New York (1990) p. 531]. Atoms other than a carbon (heteroatoms) include nitrogen, sulfur, oxygen, selenium and tellurium. Heteroaromatic monomers comprise pyrroles, thiophenes, selenophenes tellurophenes, furans, indoles, isoinoles, isothianaphtalenes, pyridines, pyrimidines, pyrazines, triazines, thiazoles, imidazoles, quinolines, isoquinolines, benzimidazoles, thiazoles, triazoles, oxidiazoles, benzopyrrolines, dithienobenzene, thianaphtene, carbazoles, benzothiophenes, isobenzothiophenes, benzofurans, isobenzofurans, isoindolines, isobenzoselenophenes, isobenzotellurophenes, thienothiophenes, their substituted derivatives, or mixtures thereof.

Some heteroaromatic monomers of this invention are illustrated in Formula 9.

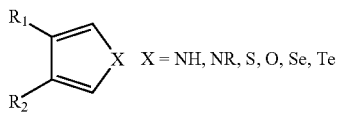

Formula 9 where R, $R_1$ or $R_2$ are selected independently of one another and may be the same or different groups including hydrogen, deuterium, halogens, alkyl, fluoroalkyl, halogenated alkyl, alkenyl, alkoxy, carboxylate, alkylcarbonyl, akanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxyalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane, or $R_1$ and $R_2$ together form an alkylene, alkenylene, alkenyloxy, alkenyldioxy, alkynyloxy, alkynyldioxy chain that completes a 3, 4, 5, 6, 7 or 8 membered alicyclic or aromatic ring which can optionally include one or more heteroatom including nitrogen, oxygen, sulfur, phosphorous, selenium, tellurium, or silicon. R, $R_1$ or $R_2$ can also be an oligomeric or polymeric chain made by repeating one or more monomers, including among others glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines.

The branched or hyperbranched poly(heteroaromatic) oligomers or polymers comprise oligomers and polymers made by copolymerization of one or more heteroaromatic monomers listed above and one or more branched or hyperbranched end-capping groups listed above. The conducting sections of the branched conducting oligomers (or hyperbranched conducting oligomers) and branched conducting copolymers (or hyperbranched conducting copolymers) of this invention preferably have 3 or more polymerized monomers (n=3 or more in certain formulas herein). In more preferred embodiments, the conducting sections have 8 or more repeating units (i.e., monomer units). The conducting sections can contain one or more different monomer units, but preferred oligomers and copolymers have conducting sections in which all of the monomers are the same.

The end-caps and end-capping groups of this invention include, among others, saturated and unsaturated alkyls, compounds containing acrylates or methacrylates, compounds containing esters, ethers, hydroxyls, epoxies or amines, epoxidized compounds, ring-opened epoxy compounds, polyglycols, polyethylene glycol, polyethers, poly(fluoroethers), polyacetals, polyolefins, polystyrene and its copolymers, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitrile and its copolymers, polybutadiene and its copolymers, alkyds, polyalcohols, polyurethanes, epoxies, cellulose and its derivatives, starch and its derivatives, other naturally occurring polymers, polypeptides, oligonucleotides, nucleotides, oligosaccharides, polysaccharides, and other biomolecules and combinations and copolymers thereof.

In preferred embodiments the conducting segment of the oligomers and copolymers of this invention contain 3 to about 100 repeating monomer units. In the most preferred embodiment the conducting segments contain 15 to 50 repeating monomer units.

In a preferred embodiment of this invention the end-capping group has one branch point and the chains off the branching point are methacrylate esters.

In another preferred embodiment of this invention the end-capping group has three to five branch points and the chains connected to the branch points are linear or branched alkyl esters, the products of the ring opening of epoxy compounds, and alkyl terminated polyethylene glycol oligomers. The end-cap chemical intermediate is copolymerized with one or more heteroaromatic monomers. Copolymerization occurs by chemical or electrochemical oxidation of the monomers.

Preferred oligomers and copolymers of this invention are soluble or dispersible in a solvent selected to facilitate processing of the copolymers. A material is soluble in a solvent or solvent mixture if it substantially dissolves in that solvent or solvent mixture at a level of at least about 0.1 g/L at room temperature. As used herein the term soluble encompasses materials where small amounts of the material may not dissolve in the selected solvent, but wherein the amount of material that does not dissolve does not significantly interfere with processability of the material or the use or application of the solution. A fully dispersible material is a material that forms a stable suspension of droplets, micelles, or colloidal particles in a liquid medium such as water, an organic solvent or a mixture thereof at a concentration of at least 0.1 g/L. The droplets, micelles or colloidal particles are stable under the force of gravity and the dispersed material does not precipitate or separate out of the liquid medium over a time period that significantly interferes with the use of the dispersed material. Preferably the material does not precipitate or separate out of the liquid medium within a one-month period after the dispersion is formed. A material is dispersible in a liquid medium if it substantially disperses. As used herein the term "dispersible" encompasses materials where small amounts of the material may not disperse in the selected liquid medium, but wherein the amount of material that does not disperse does not significantly interfere with processability of the material or the use or application of the dispersion.

Chemical polymerization of heteroaromatic monomers can be performed in the presence of an oxidizing agent comprising one or more of the following: hydrogen peroxide; organic or inorganic peroxides; persulfates; peracids; peroxyacids; hypobromite; bromates; hypochlorite; chlorates; perchlorates; periodates; organic or inorganic salts of iron (III), chromium (IV), chromium (VI), manganese (VII), manganese (V), manganese (IV), vanadium (V), osmium (VIII), ruthenium (IV), mercury (II), copper (II), lead (IV), molybdenum (VI); gasses such as oxygen, ozone, chlorine, bromine, $SO_2$, $SO_3$, $NO_2$; organic oxidants such as formic acid, oxalic acid, oxalyl chloride, acetic anhydride, trifluoroacetic anhydride, and substituted or unsubstituted quinones. The polymerization reaction is carried out in a solvent or mixture of solvents which can include acetonitrile, propionitrile, methoxypriopnitrile, nitromethane, nitroethane, propylene carbonate, ethylenecarbonate, N-methylpyrrolidone, water, glycols, alcohols, alkoxyalcohols, ketones, esters, linear and cyclic ethers, alkoxyethers, chlorinated solvents, carbonates, nitrites, amides, sulfoxides, hydrocarbon and aromatic solvents and mixtures thereof. The polymerization is typically carried out at a temperature between −80° C. and the boiling point of the solvent used. In a preferred embodiment the polymerization is carried out at room temperature. Polymerization may be carried out in the presence of an organic or inorganic acid, salts, polyelectrolytes, polyacids, and mixture thereof.

Preferred heteroaromatic monomers are thiophene and pyrrole and derivatives thereof, particularly those derivatives carrying substituents in position 3 or in positions 3 and 4 on the aromatic ring. Substituents have been defined above. More preferred heteroaromatic monomers are pyrrole, N-methylpyrrole, N-alkylpyrrole, 3-methylpyrrole, 3-methoxypyrrole, thiophene, 3-methylthiophene, 3-hexylthiophene, 3-octylthiophene, 3-methoxythiophene, 3,4-ethylenedioxythiophene, thieno[3,4-b]thiophene, 3,4-propylenedioxythiophene, 3,4-butylenedioxythiophene, 3,4-ethylenedioxypyrrole, and 3,4-propylenedioxypyrrole.

The end-caps of this invention may contain one or more latent polymerizable groups for further reaction or crosslinking. Latent polymerizable groups include acrylates, methacrylates, vinyl esters, vinyl ethers, olefins, and substituted olefins, isocyanates, thioisocyanantes, nitriles, epoxy groups, alkyds, alkoxysilanes, vinylsilanes, amino, hydroxyl, thiol, carboxy, anhydrides, phenols, aldehydes, furans, melamine, unsaturated polyesters, cyanate esters, cyano acrylates, acetylenes, esters, amides, lactones and lactams. Most preferred polymerizable groups include acrylates and methacrylates that can be cross-linked by radical or cationic polymerization in the presence of radical initiators such as redox initiators, peroxides, azo compounds, radical photoinitiators, or cationic initiators. In a preferred embodiment the hydroxyl groups present on the end-cappers from the ring opening of epoxies are cross-linked by addition of di- or poly-isocyanates.

Preferred chemistries for the formation of end-caps of the synthesis first include reacting heteroaromatic compounds with an alkyl lithium compound forming a lithiated heteroaromatic compound. The lithium substitution is preferably at the "2" position for thiophenes and pyrroles. The lithiated heteroaromatic compound is attached to a compound containing an epoxy ring by ring opening addition.

The product of this first reaction can be further reacted with electrophilic compounds. Preferred electrophilic compounds include acyl chlorides, carboxylic acid anhydrides, an asymmetric anhydrides, epoxy compounds, activated carbon-carbon double bonds, compounds containing a suitable leaving group such as a tosylate, a halogen, or an isocyanate. In a preferred embodiment the product of the first reaction is reacted with a compound that, upon reaction, forms a new reactive site (or a latent reactive site which can be activated for reaction) which in turn further can react with the compound itself or a different compound.

The polymerization reaction is preferably carried out with an iron(III) salt, molecular oxygen, ozone, a peroxide, hydrogen peroxide, or a persulfate. Preferably an organic acid or its salt is present during the polymerization. Preferred organic acids include para-toluenesulfonic acid, dodecylbezensulfonic acid, poly(styrenesulfonic acid), di-nonyl-naphtalenesulfonic acid, trifluoromethane sulfonic acid, and mono- and dialkyl sulfosuccinates. The most preferred organic acid is para-toluenesulfonic acid. Preferred solvents for the polymerization are acetonitrile, THF, acetone, methylethylketone, chloroform, dichlorometrhane, nitromethane, and mixtures thereof. The most preferred solvent is acetonitrile.

In general the invention provides intermediates for use in the synthesis of intrinsically conducting polymers and oligomers, particularly intrinsically conducting copolymers and cooligomers. Intermediates include dialkoxide lithium salts of the following formulas:

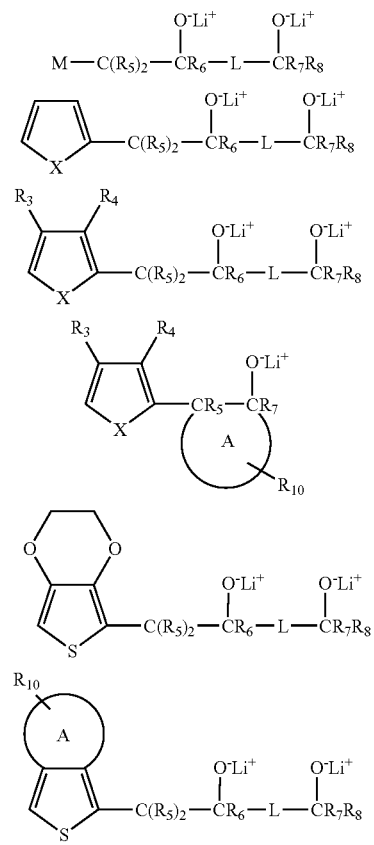

-continued

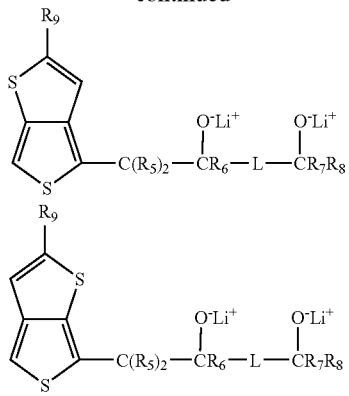

and the corresponding dianions and salts thereof (other than Li+ salts, for example, other alkali metals cations (Na+ or K+) or alkaline earth metals (Mg$^{2+}$ or Ca$^{2+}$, where both lithium cations are replaced with a single doubly charged cation) and the corresponding alcohols or diols. Other cations useful for making salts of these intermediates will be readily apparent to one of ordinary skill in the art.

In these formulas:

M is any heteroaromatic monomer useful for the preparation of an intrinsically conducting polymer or oligomer. More specifically the heteroaromatic monomer can be selected from pyrroles, thiophenes, selenophenes tellurophenes, furans, indoles, isoinoles, isothianaphthalenes, pyridines, pyrimidines, pyrazines, thienothiophenes, triazines, thiazoles, imidazoles, quinolines, isoquinolines, benzimidazoles, thiazoles, triazoles, oxidiazoles, benzopyrrolines, dithienobenzene, thianaphtene, carbazoles, benzothiophenes, isobenzothiophenes, benzofurans, isobenzofurans, isoindolines, isobenzoselenophenes isobenzotellurophenes, their substituted derivatives, wherein possible substituents are discussed below;

L is a single bond, or is a linker between the indicated moieties which can be selected from optionally substituted alkylene, including cyclic alkylene groups, alkenylene, and arylene groups, optionally substituted ether or polyether groups, optionally substituted thioether or polythioether groups, where any substituents on the linker groups are not reactive under the conditions of the oxidative polymerization reactions herein with the understanding that substituent groups that are reactive can be protected using protective group chemistry that is well known in the art. More specifically substituents should be stable to reaction in the presence of strongly basic conditions and stable to reaction with nucleophiles. Again substituents can be protected with known protecting groups if desired or necessary to prevent undesired reaction. Alkyl and alkenyl groups can be straight-chain, branched or cyclic. Aryl groups can contain one or more 5- or 6-member aromatic rings and may be heteroaryl groups in which one or more carbons in one or more rings are replaced with a heteroatom or substituted heteroatom (non-carbon atom), including heteroatoms selected from O, S, or N or substituted heteroatom NH or NR (where R is defined below);

X is NH, NR, S, O, Se or Te where R is selected from hydrogen, deuterium, halogens, alkyl, fluoroalkyl, halogenated alkyl, alkenyl, alkoxy, carboxylate, alkylcarbonyl, akanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane. In specific embodiments, R is hydrogen or alkyl groups, particularly small alkyl groups having 1 to about 6 carbon atoms;

A is a 5-, 6-, 7-, or 8-member carbon ring which may have one or two double bonds or can be aromatic and in which one or two of the carbons in the ring can be replaced with NH, NR (where R is defined above), O or S;

$R_3$, and $R_4$ are selected independently of one another and may be the same or different groups including hydrogen, deuterium, halogens, alkyl, fluoroalkyl, halogenated alkyl, alkenyl, alkoxy, carboxylate, alkylcarbonyl, akanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane, or $R_3$ and $R_4$ together form an alkylene, alkenylene, alkenyloxy, alkenyldioxy, alkynyloxy, alkynyldioxy chain that completes a 3-, 4-, 5-, 6-, 7- or 8-membered alicyclic or aromatic ring which can optionally include one or more heteroatom including nitrogen, oxygen, sulfur, phosphorous, selenium, tellurium, or silicon. $R_3$ or $R_4$ can also be an oligomeric or polymeric chain made by repeating one or more monomers, including among others glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines. In specific embodiments, $R_3$ and $R_4$ are both hydrogens, are both alkyl groups or together form a 5- or 6-member ring that contains, one or more heteroatoms (e.g., N, S or O). In specific embodiments, R11 is a hydrogen or a small alkyl group;

each $R_5$, independent of other $R_5$, is selected from the group hydrogen, optionally substituted alkyl (particularly short alkyl having 1 to 3 carbons), halogens (particularly fluorine), and any other substituents selected from optional substituents listed below that is stable to the oxidative polymerization conditions to be employed and more specifically stable to reaction with strong base or strong nucleophile. Again substituents can be protected with known protecting groups if desired or necessary to prevent undesired reaction. One or both of $R_5$ and one or more of $R_6$, $R_7$ or $R_8$ can together form a 3- to 10-membered carbon ring having one or two double bonds and wherein one or more of the ring carbons can be replaced with O, S, N or $NR_9$. Any rings formed are preferably 4-, 5-, 6- or 7-member rings;

$R_6$ and $R_7$, independently of one another, are selected from the group hydrogen, optionally substituted alkyl groups (particularly small alkyl groups having 1 to 6 or 1 to 3 carbons), halogens (particularly fluorine), and any other substituents selected from optional substituents listed below that are stable to the oxidative polymerization conditions to be employed and more specifically stable to reaction with strong base or strong nucleophile. One of $R_6$ or $R_7$ can be an oligomeric or polymeric chain made by repeating one or more monomers, including among others glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines. Again substituents can be protected with known protecting groups if desired or necessary to prevent undesired reaction;

$R_9$, independently of one another, is selected from the group hydrogen, optionally substituted alkyl groups (e.g. those having form 1-14 carbon atoms and particularly small alkyl groups having 1 to 6 or 1 to 3 carbons), optionally substituted alkenyl groups, halogens (particularly fluorine), and any other substituent selected from optional substituents listed below that are stable to the oxidative polymerization conditions to be employed and more specifically stable to reaction with strong base or strong nucleophile. Again substituents can be protected with known protecting groups if desired or necessary to prevent undesired reaction. $R_9$ may also be a substituent, such as an electron withdrawing group or an electron donating group (these terms are well-known in the art), which can conjugate with the ring if it is aromatic. Again substituents can be protected with known protecting groups if desired or necessary to prevent undesired reaction.

$R_{10}$ represents one or more non-hydrogen substituents on the A ring (where $R_{10}$ may be a substituent on a heteroatom) which are selected from halogens, particularly fluorine, optionally substituted alkyl groups, particularly alkyl groups having from 1 to 14 carbon atoms, optionally substituted alkenyl groups, optionally substituted aryl groups and any other substituent selected from optional substituents listed below that is stable to the oxidative polymerization conditions to be employed and more specifically stable to reaction with strong base or strong nucleophile. $R_{10}$ may also be a substituent, such as an electron withdrawing group or an electron donating group (these terms are well-known in the art), which can conjugate with the ring if it is aromatic. Two or more of $R_{10}$ may form a 3- to 10-membered carbon ring (more specifically a 4- to 8-membered ring) in which one or more carbons of the ring are replaced with O, S, N or NH and which may contain one or two double bonds. Again substituents can be protected with known protecting groups if desired or necessary to prevent undesired reaction.

Substituents for the groups above (including those for optional substitution) can include any and all non-hydrogen functional groups that are stable to the oxidative polymerization conditions and which do not disrupt the polymerization reaction. Optional substituents specifically can be selected from halogens, particularly fluorine, alkyl groups, alkenyl groups, alkynyl groups, aryl groups, phenyl groups, benzyl groups, fluoroalkyl groups, fluoroaryl groups, fluorophenyl groups, fluorobenzyl groups, perfluorinated alkyl groups; perfluorinated aryl groups, perfluorinated phenyl groups, alkoxy groups, nitro groups, cyano groups, isocyano groups, thiocyano groups, amino groups ($NH_2$ or $NR_2$, where R is defined above), ester groups, acyl groups, ether groups, polyether groups, thioether groups, thiol groups, azide groups, carboxylate groups alkylcarbonyl groups, akanoyl groups, alkylthio, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, sulfonate, alkylsulfonate, arylsulfonate, alkylsulfate, arylsulfate, alkylsilane, and arylsilane, It is understood that certain substituent groups may be reactive under oxidative polymerization conditions, in this case one of ordinary skill in the art can select protective groups which will prevent reaction at those reactive substituents under the conditions of the oxidative polymerization reaction. Appropriately protected substituent groups can be employed in the intermediates and other materials of this invention.

Alkyl and alkenyl groups can be straight-chain, branched or cyclic. Aryl groups can contain one or more 5- or 6-member aromatic rings and may be heteroaryl groups in which one or more carbons in one or more rings are replaced with a heteroatom or substituted heteroatom (non-carbon atom), including heteroatoms selected from O, S, or N or substituted heteroatom NH or NR (where R is defined above).

Additional intermediates for use in the synthesis of intrinsically conducting polymers and oligomers, particularly intrinsically conducting copolymers and cooligomers. include alkoxide lithium salts of the following formulas:

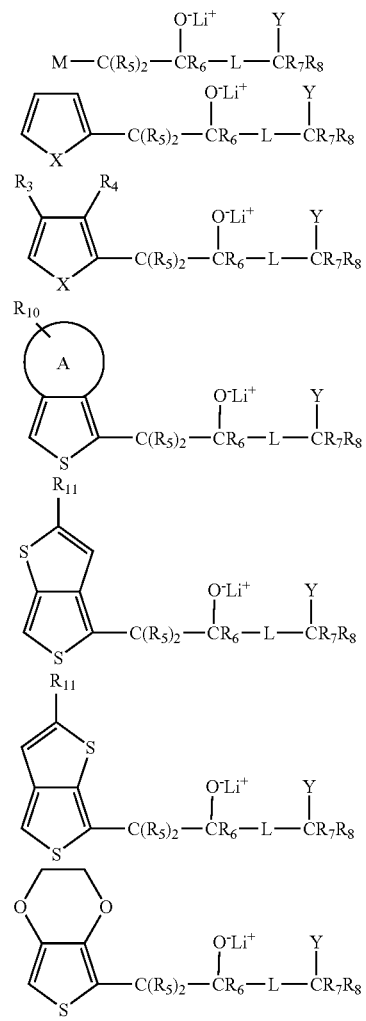

and the corresponding anions and salts thereof in addition to $Li^+$ salts, for example, other alkali metals cations ($Na^+$ or $K^+$) or alkaline earth metals ($Mg^{2+}$ or $Ca^{2+}$, where both lithium cations are replaced with a single doubly charged cation) and the corresponding alcohols. Other cations useful for making salts of these intermediates will be readily apparent to one of ordinary skill in the art, where Y is hydrogen, optionally substituted alkyl, optionally substituted alkenyl, optionally substituted aryl any other substituent selected from optional substituents listed herein that are stable to the oxidative polymerization conditions to be employed and more specifically stable to reaction with strong base or strong nucleophile as well as any reactive or labile substituents that can be protected employing a protecting group. Y can also be a latent reactive groups, such as protected carboxylic acid ester, protected thiol, protected aldehyde, nitro, cyano, protected amine; and other variables are as defined above. Other variables are as defined above.

In general the invention provides intermediates for use in the synthesis of intrinsically conducting oligomers, polymers, copolymers. Intermediates include those formed by reaction of the dialkoxide lithium salt with acid chlorides or anhydrides (as exemplified in Schemes 3-5) and those formed by reaction with epoxides (as illustrated in Scheme 1):

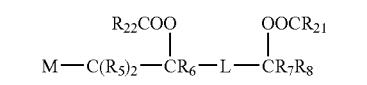

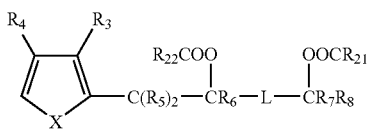

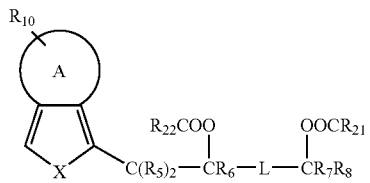

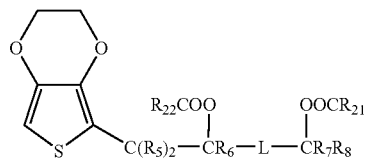

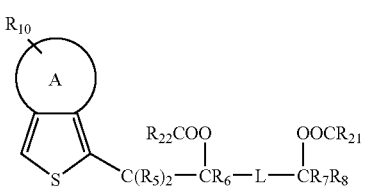

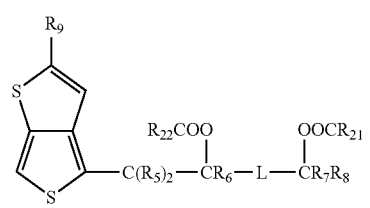

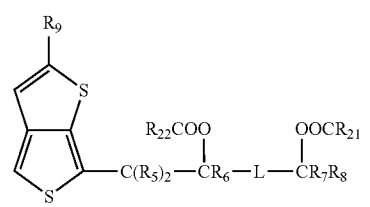

and any salts thereof where $R_{22}$ and $R_{21}$ are defined below.

Additional intermediates of this invention for use in the synthesis of oligomers, polymers and copolymers include those having the following formulas:

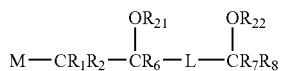

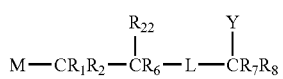

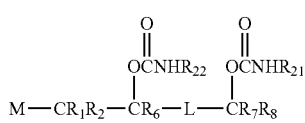

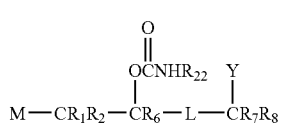

and any salts thereof wherein $R_{21}$ and $R_{22}$ are defined below and all other variables are defined above.

Additional intermediates of this invention for use in the synthesis of oligomers, polymers and copolymers include those having the following formulas:

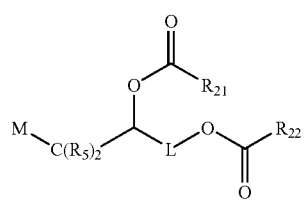

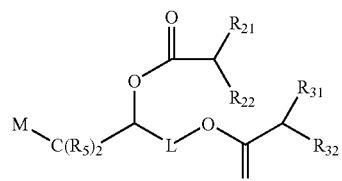

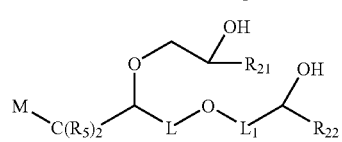

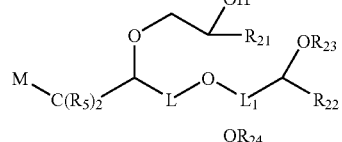

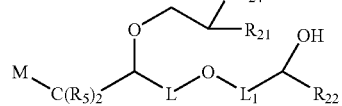

-continued

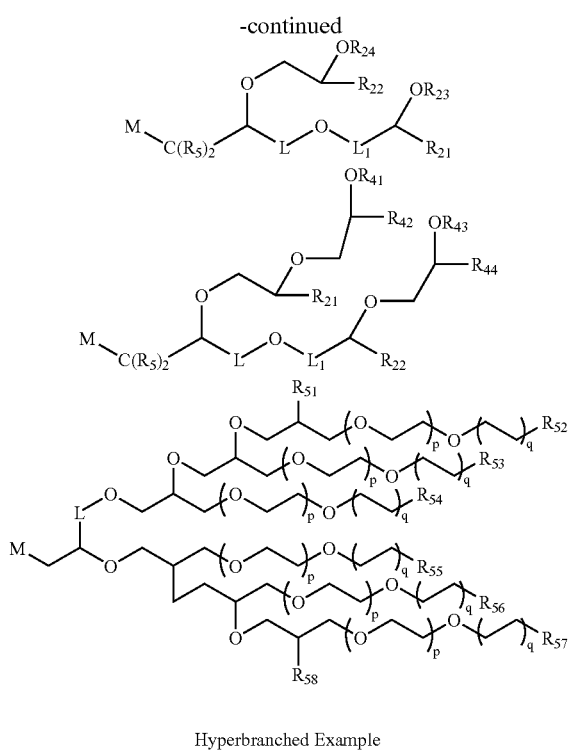

Hyperbranched Example and any salts thereof where:

Each of $R_{21}$, $R_{22}$, $R_{23}$, $R_{24}$, $R_{31}$, $R_{32}$, $R_{41}$, $R_{42}$, $R_{43}$, $R_{44}$, and/or $R_{51}$-$R_{58}$, independently of one another and independent of other R groups in the molecule, are hydrogen, deuterium, alkyl, alkenyl, alkoxy, aryl, phenyl, carboxylate, alkylcarbonyl, akanoyl, alkylthio, cycloalkyl, cycloalkoxy, alkyloxy, alkenyloxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitroalkyl, alkylsilane, arylsilane, or an oligomeric or polymeric chain made by repeating one or more monomers, including among others glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines. These R groups may also be generally selected from saturated and unsaturated alkyls, compounds containing acrylates or methacrylates, compounds containing esters, ethers, hydroxyls, epoxies or amines, epoxidized compounds, ring-opened epoxy compounds, polyglycols, polyethylene glycol, polyethers, poly(fluoroethers), polyacetals, polyolefins, polystyrene and its copolymers, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitrile and its copolymers, polybutadiene and its copolymers, alkyds, polyalcohols, polyurethanes, epoxies, cellulose and its derivatives, starch and its derivatives other naturally occurring polymers, polypeptides, oligonucleotides, nucleotides, oligosaccharides, polysaccharides, and other biomolecules and combinations and copolymers thereof. Variable $L_1$ has the same definition as L and all other variables are defined above.

In particular embodiments, each of $R_{21}$, $R_{22}$, $R_{23}$, $R_{24}$, $R_{31}$, $R_{32}$, $R_{41}$, $R_{42}$, $R_{43}$, and/or $R_{44}$, can be hydrogen, deuterium, halogens, alkyl, fluoroalkyl, halogenated alkyl, alkenyl, alkoxy, carboxylate, alkylcarbonyl, akanoyl, alkylthio, mercapto, cycloalkyl, cycloalkoxy, alkenyldioxy, aryl, alkylaryl, arylalkyl, aryloxy, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, or arylsilane. R can also be an oligomeric or polymeric chain comprised of polyethers, poly(fluoroethers), polyglycols, polyactals, polyolefins, polystyrene and its copolymers, polyfluoroolefins, polyoxides, polychloroolefins, polychlorofluoroolefins, polysiloxanes, polyesters, polybromoesters, natural and synthetic rubbers (vulcanized or un-vulcanized), polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitrile and its copolymers, polybutadiene and its copolymers, alkyds, polyalcohols, polyurethanes, epoxies, cellulose and its derivatives, starch and its derivatives, other natural occurring polymers, polypeptides, oligopeptides, polysaccharides, oligosaccharides, nucleotides, oligonucleotides, and other biomolecules and combinations and copolymers thereof. Furthermore, any of the about R groups can be comprised of combinations of the above materials in the form of copolymers, block copolymers, graft copolymers, comb copolymers, brush copolymers, dendridic copolymers, branched copolymers, hyper-branched copolymers, and end-capped copolymers.

Any of the listed groups, where chemically feasible, can be optionally substituted as discussed above. In specific embodiments, $R_{21}$, $R_{22}$, $R_{23}$, $R_{24}$, $R_{31}$, $R_{32}$, $R_{41}$, $R_{42}$, $R_{43}$, and/or $R_{44}$ are selected from the group of hydrogen, alkyl, fluoroalkyl, alkenyl, fluoroalkenyl, alkenyldioxy, alkyloxy, alkenyloxy, and aryloxy. In specific embodiments $R_{21}$, $R_{22}$, $R_{23}$, $R_{24}$, $R_{31}$, $R_{32}$, $R_{41}$, $R_{42}$, $R_{43}$, and/or $R_{44}$ include linear and branched alkyl, alkenyl, aryl, poly(ethyleneglycol) oligomers, alkyl terminated poly(ethylene glycol)s, aryl terminated poly(ethylene glycol)s, poly(propyleneglycol) oligomers, poly(ethylene-co-propylene glycol) oligomers, alkyl terminated poly(ethylene-co-propylene glycol) oligomers, polyesters oligomers, and polyfluoroethers.

In the hyperbranched example formula above p and q are integers indicating the length of polyether chains; p and q may be the same or different integers and p's and q's in different chains may be the same or different. These integers p and q can generally range from 1 to about 100, but are more typically 5 to about 25. In a specific embodiment, p is larger than q. In a specific embodiment of these hyperbranched intermediates, $R_{51}$-$R_{58}$ are independently selected from H, OH, optionally substituted alkyl, fluorinated alkyl, and fluorine.

The various intermediates listed in the formulas above are useful in methods described herein for the preparation of intrinsically conducting oligomers, polymers and block copolymers. The various intermediates listed herein above can be readily synthesized in view of the description herein, including the examples, and further in view of what is commonly known in the art about the synthesis of organic species and polymers. Intermediates of this invention are used to prepare polymeric materials and as a result their structures or a portion of their structures become incorporated into the polymer. The invention is intended to encompass polymers which incorporate significant portions of these intermediate, or polymers wherein the intermediates and repeating units comprising the intermediates are incorporated into the structure of the polymer.

In specific embodiments the invention provides an end-capped oligomer of heteroaromatic monomers where the end-cap is non-conjugated and non-electrically conducting, and the end-cap contains at least one branch. The branched end-cap can comprise one or more latent polymerizable groups.

In specific embodiments the invention provides an end-capped oligomer of heteroaromatic monomers where the end-cap is non-conjugated and non-electrically conducting, and the end-cap is hyperbranched. Thee hyperbranched branched end-cap can comprise one or more latent polymerizable groups. The end-capped oligomer can contains two or more branches, where each branch is a chemical structure where a single atom is covalently bonded to three or more separate chains of covalently bonded atoms.

In specific embodiments the invention provides an ABA triblock copolymer where the "B" block is an oligomer or polymer of heteroaromatic monomers, and the "A" block is an end-cap that is non-conjugated and non-electrically conducting, and the end-cap contains at least one branch.

In specific embodiments the invention provides an ABA triblock copolymer where the "B" block is an oligomer or polymer of heteroaromatic monomers, and the "A" block is an end-cap that is non-conjugated and non-electrically conducting, and the end-cap is hyperbranched.

In specific embodiments the invention provides an end-capping monomer which comprises a heteroaromatic monomer group, and a branched, non-conjugated, non-electrically conductive group attached to the heteroaromatic monomer group at the "2" position of the heteroaromatic ring. The invention further provides an intrinsically conducting polymer or an intrinsically conducting oligomer containing or incorporating this end-capping monomer. The invention further provides an intrinsically conducting polymer or an intrinsically conducting oligomer made by copolymerization of this end-capping monomer with one or more heteroaromatic monomers in the presence of a chemical oxidizing agent. The invention further provided a method for preparing an end-capped oligomer or an ABA triblock copolymer by copolymerization of this end-capping monomer with one or more heteroaromatic monomers in a polar aprotic solvent and in the presence of a chemical oxidizing agent.

In specific embodiments the invention provides an end-capping monomer which comprises a heteroaromatic monomer group, and a hyperbranched, non-conjugated, non-electrically conductive group attached to the heteroaromatic monomer group at the "2" position. The invention further provides an intrinsically conducting polymer or an intrinsically conducting oligomer containing this end-capping monomer. The invention further provides an intrinsically conducting polymer or an intrinsically conducting oligomer made by copolymerization of this end-capping monomer with one or more heteroaromatic monomers in the presence of a chemical oxidizing agent. The invention further provides an intrinsically conducting polymer or an intrinsically conducting oligomer made by electrochemical copolymerization of this end-capping monomer with one or more heteroaromatic monomers. The invention also provided a method for preparing an end-capped oligomer or an ABA triblock copolymer by copolymerization of this end-capping monomer with one or more heteroaromatic monomer in a polar aprotic solvent in the presence of a chemical oxidizing agent.

In an embodiment, the invention provides a 3,4-ethylendioxythiophene-dialkoxide with the following chemical structure:

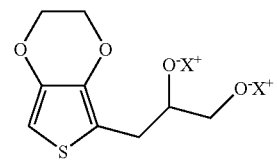

where each X separately is Li, Na or K or where 2 X+ together are Mg or Ca. The invention also provides a chemical compound, oligomer, copolymer, polymer or block copolymer containing the 3,4-ethylendioxythiophene-dialkoxy moiety as shown in this formula. The invention also provides an intrinsically conducting polymer or an intrinsically conducting oligomer containing the 3,4-ethylendioxythiophene-dialkoxy moiety. The invention provides reaction products of the 3,4-ethylendioxythiophene-dialkoxide compound.

In another specific embodiment the invention provides a chemical compound having the chemical structure:

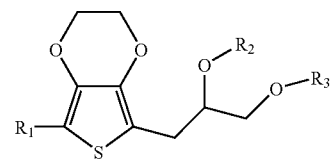

where R1 is a hydrogen atom, and R2 and R3 are the same or different and are selected from hydrogen, deuterium, saturated and unsaturated alkyl compounds, linear or branched alkyl compounds, acrylates or methacrylates or compounds containing acrylates or methacrylates, aliphatic or aromatic esters or compounds containing esters, compounds containing ethers, compounds containing hydroxyls, epoxies or amines, epoxidized compounds, the products of ring-opened epoxy compounds. R1 and R2 can also be oligomeric or polymeric materials including polyglycols, polyethyleneglycol, polyethers, poly(fluoroethers), polyacetals, polyolefins, polystyrene and its copolymers, poly-N-vinylpyrrolidone, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitriles and its copolymers, polybutadiene and its copolymers, alkyds, polyalcohols, polyurethanes, epoxies, cellulose and its derivatives, starch and its derivatives, other natural occurring polymers, polypeptides, and other biomolecules and combinations and copolymers thereof. A method for making these compounds by reaction of the corresponding dialkoxide with an electrophilic reagent such as an acyl chloride, a carboxylic acid anhydride, an asymmetric anhydride, an epoxy compound, an activated carbon-carbon double bond, or a compound containing an suitable leaving group such as a tosilate or an halogen is provided. An exemplary method involves the steps of hydrolyzing the dialkoxide to the corresponding diol and reacting the diol with a reactive compound such as an acyl chloride, a carboxylic acid anhydride, an asymmetric anhydride, an epoxy compound, an hydrolizable silane and an isocyanate. Another method for making these compounds comprises the steps of reacting the dialkoxide with a first electrophilic reagent such as an epoxy compound, where the product of this first reaction forms another nucleophilic species (an alkoxide) and reacting the alkoxide formed in the first with a second reactive compound such as an acyl chloride, a carboxylic acid anhydride, an asymmetric anhydride, an epoxy compound, an activated carbon-carbon double bond, a compound containing an suitable leaving group such as a tosilate or an halogen. This second step can be repeated two or more times.

The invention further provides intrinsically conducting polymers or intrinsically conducting oligomers containing the dioxy moiety of the structure:

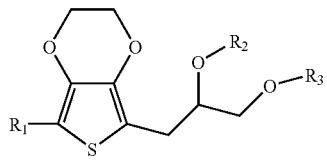

Also provided are an intrinsically conducting polymer or an intrinsically conducting oligomer made by copolymerization of the compound of this formula with one or more heteroaromatic monomer in the presence of a chemical oxidizing agent or by electrochemical copolymerization. The invention further provides chemical compounds of the above formula which comprises one or more latent polymerizable groups. In general, a latent polymerizable group can be selected from the list of acrylates, methacrylates, vinyl esters, vinyl ethers, olefins, and substituted olefins, isocyanates, thioisocyanantes, nitriles, epoxy groups, alkyds, alkoxysilanes, vinylsilanes, amino, hydroxyl, thiol, carboxy, anhydrides, phenols, aldehydes, furans, melamine, unsaturated polyesters, cyanate esters, cyano acrylates, acetylenes, esters, amides, lactones and lactams.

Oligomers of this invention can contain 3 to 50 heteroaromatic monomer units. A poly(heteroaromatic) oligomer of this invention in its doped and conducting form can exhibit bulk conductivity of $10^{-6}$-$10^3$ S/cm, as determined by the four-point method on a pressed pellet of the material.

Heteroaromatic monomers useful in this invention can be selected, among others, from 3,4-ethylenedioxythiophene, thieno[3,4-b]thiophene, N-methylpyrrole, N-alkypyrrole, 3-methylpyrrole, 3-methoxypyrrole, thiophene, 3-methylthiophene, 3-hexylthiophene, 3-octylthiophene, 3-methoxyhiophene, 3,4-propylenedioxythiophene, 3,4-butylenedioxythiophene, 3,4-ethylenedioxypyrrole, and 3,4-propylenedioxypyrrole.

The non-conjugated, non-electrically conductive branched end-cap is selected from the list of saturated and unsaturated alkyl compounds, compound containing acrylates or methacrylates, compounds containing esters, ethers, hydroxyls, epoxies or amines, epoxidized compounds, ring-opened epoxy compounds, polyglycols, polyethyleneglycol, polyethers, poly(fluoroethers), polyactals, polyolefins, polystyrene and its copolymers, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitriles and its copolymers, polybutadiene and its copolymers, alkyds, polyalcohols, polyurethanes, epoxies, cellulose and its derivatives, starch and its derivatives, other natural occurring polymers, polypeptides, and other biomolecules and combinations and copolymers thereof.

Latent polymerizable groups can be are selected, for example, form acrylates, methacrylates, vinyl esters, vinyl ethers, olefins, and substituted olefins, isocyanates, thioisocyanantes, nitriles, epoxy groups, alkids, alkoxysilanes, vinylsilanes, amino, hydroxyl, thiol, carboxy, anhydrides, phenols, aldehydes, furans, melamine, unsaturated polyesters, cyanate esters, cyano acrylates, acetylenes, esters, amides, lactones and lactams.

ABA triblock copolymer of this invention can contain more than 50 monomer units. The ABA triblock copolymer of this invention wherein the poly(heteroaromatic) oligomer is in its doped and conducting form can exhibit a bulk conductivity of $10^{-6}$-$10^3$ S/cm, as determined by the four-point method on a pressed pellet of the material.

Intermediates of this invention can be polymerized or cross-linked to provide polymers, copolymers and crosslinked polymers and copolymers. Intermediates of this invention can be reacted with one or more additional monomers or polymerized or crosslinked in the presence of one or more monomers which monomers may contain one or more latent polymerizable groups to product polymeric materials.

The invention provides polymerized materials (polymers, copolymers, crosslinked polymers and crosslinked copolymer made employing any intermediates of this invention.

The invention provides methods for preparing a hyper branched end-capping monomer by reacting the compound:

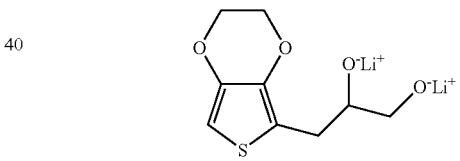

with a mono-epoxy compound in such a way to obtain a product that has two to seven branch points.

When a group of substituents is disclosed herein, it is understood that all individual members of those groups and all subgroups, including any isomers and enantiomers of the group members, and classes of compounds that can be formed using the substituents are disclosed separately. When a Markush group or other grouping is used herein, all individual members of the group and all combinations and subcombinations possible of the group are intended to be individually included in the disclosure. When a compound is described herein such that a particular isomer or enantiomer of the compound is not specified, for example, in a formula or in a chemical name, that description is intended to include each isomers and enantiomer of the compound described individual or in any combination. It is understood in the art, that stable and unstable (radioactive) isotopes of various atoms that comprise the chemical species herein. Unless, otherwise stated, any isotopic variant of a species of this invention is intended to be encompassed by the invention. Specific names of compounds are intended to be exemplary, as it is known that one of ordinary skill in the art can name the same compounds differently. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound is claimed, it should be understood that compounds known in the art including the compounds disclosed in the references disclosed herein are not intended to be included in the claim.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

The invention illustratively described herein suitably may be practiced in the absence of any element or elements, limitation or limitations which is not specifically disclosed herein.

One of ordinary skill in the art will appreciate that starting materials, reagents, solid substrates, synthetic methods, purification methods, and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification. Some references provided herein are incorporated by reference to provide details concerning sources of starting materials, additional starting materials, additional reagents, additional methods of synthesis, additional methods of analysis and additional uses of the invention.

EXAMPLES

Example 1

Preparation of the EDOT di-alkoxide

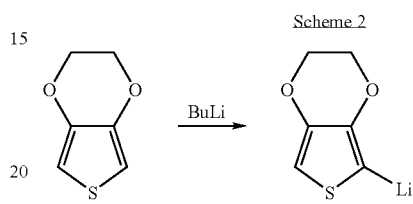

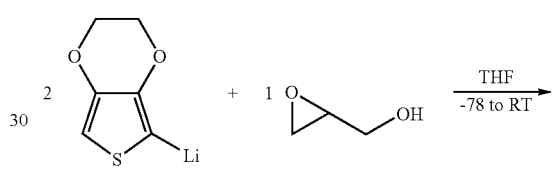

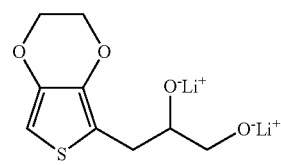

In this procedure, illustrated in Scheme 2,3,4-ethylenedioxy-thiophene (EDOT) is lithiated at the "2" position. Then, two equivalents of lithiated EDOT are reacted with glycidol to produce a di-lithium di-alkoxide. A first equivalent of the lithiated EDOT de-protonated the glycidol, while a second equivalent attacked the epoxide ring and forms a covalent bond. This material precipitates out of a THF/Hexane mixture, and is easy to clean and isolate.

The details of the di-alkoxide preparation follow: A 500 ml "airfree" Schlenk flask was dried in a drying oven (120° C.) for one hour prior to use. A magnetic stir bar was added. While the flask was still hot, it was connected to the vacuum side of the Schlenk line and a vacuum was pulled on the flask to fully remove adsorbed water. Once the flask was dry, positive argon pressure was used for the duration of this reaction.

EDOT (19.5854 g, 142.178 g/mol, 137.75 mmol, Aldrich 483028 used as-received) was added to the flask by turning up the flow rate of argon gas feed to the Schlenk line, lifting off the septum on the flask, pouring the EDOT into the flask, replacing the septum and returning the argon flow rate to normal. The flask was further vented with argon (a needle was inserted into the septum), and 76 g of anhydrous THF (Aldrich 99.9%, 401757) was added via cannula. The 250 ml Schlenk flask was fitted with a metal Dewar flask and alcohol (95% ethanol/5% isopropanol, EM Science, distributed by Alameda Chemical & Scientific, AX0441-3) was added to the Dewar flask to a level above the liquid level inside the Schlenk flask. Liquid nitrogen was slowly added until the temperature of the bath was −78 C. The first chemical transformation is to de-protonate the EDOT. Using a cannula and positive argon gas pressure, n-BuLi (62.41 g, 0.68 g/mL, 91.78 mL, 1.6 M solution in hexanes, 146.85 mmol, Aldrich 186171) was slowly added to the reaction flask. The n-BuLi bottle was placed on an analytical balance to measure the mass that was transferred to the reaction flask. A precipitate formed (the EDOT anion) and more liquid nitrogen was added to keep the bath cold. After stirring cold (−78 C) for 15 minutes, the flask was lifted, the Dewar flask put aside, the flask re-lowered to continue stirring, and the solution was allowed to warm for about 5 minutes, after which the precipitated EDOT anion dissolved. As soon as the solution turned clear, the Dewar flask was replaced and the flask contents were re-cooled to −78 C. On re-cooling to −78° C., the anion again precipitated. A syringe was purged with argon, and used to add glycidol (5.44 g, 74.079 g/mol, 73.435 mmol, 96%, Aldrich, 556525) slowly to the flask over 5 minutes.

The mixture was stirred overnight, during which time the cooling bath was allowed to slowly warm to room temperature. (This warming step can alternatively be performed in as short as one hour.) During this time, the solids dissolved, giving a colorless and slightly cloudy solution. A tan/white precipitate was present. The material was allowed to warm to room temperature, and then was purified by washing with toluene and hexane. 50 ml toluene (99.8%, Aldrich 244511) was added using an argon purged 50 ml syringe. This mixture was stirred and then filtered using a combination of glass microfiber and filter paper #4. The filter was fitted to a sectioned plastic syringe connected to a cannula needle. (This filter was inside the argon purged flask). This process was repeated with another 50 ml of toluene (2×50 ml total) and then 3×50 ml hexane (95+%, Aldrich, 208752). Toluene removes unreacted EDOT or gycidol, and the hexane removes toluene and make it easier to dry the product. Also, for this reaction the solids were allowed to settle, to minimize any clogging of the filter paper. (An alternative method is to centrifuge the solution in vials with septa, and remove the supernatant by cannula). Next, the solid was dried under a stream of argon for an hour, and then further dried in an argon purged glove-box overnight before collecting and storing in vacuo. A tan, free-flowing solid was collected (15.216 g, 66.71 mmol, 90.8% yield).

A small sample of the solid was slurried in $CDCl_3$, and then treated with a few drops of 20% $DCl/D_2O$. After filtration through a short plug of $NaHCO_3$, a proton NMR was recorded, which was consistent with formation of the desired diol (corresponding to the dilithium dialkoxide): δ 6.33 (s, 1H); 4.20 (s, 4H); 3.93 (ddt, J=6.8, 6.3, 3.6 Hz, 1H), 3.68 (dd, J=10.4, 3.9 Hz, 1H), 3.53 (dd, J=10.4, 6.4 Hz, 1H), 2.85 (d, J=6.3 Hz, 2H).

Example 2

Reaction of the di-alkoxide with methacryloyl chloride

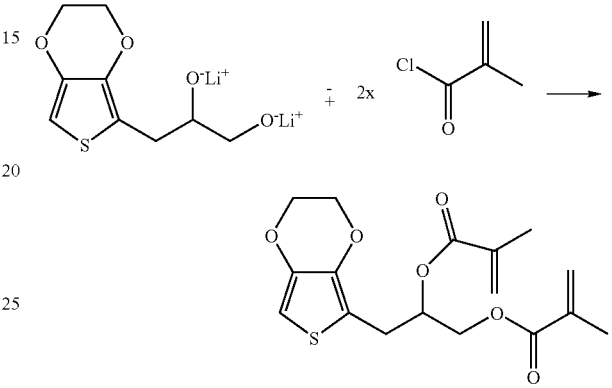

Scheme 3

Scheme 3 illustrates reaction of the di-alkoxide with methacryloyl chloride. The di-alkoxide from Example 1 (7.9550 g, 228.09 g/mol, 34.876 mmol) was slurried in 50 mL anhydrous THF (Aldrich 99.9%, 401757) in a 200 mL Schlenk flask. The mixture was cooled to −10° C. in an ice-ethanol bath. Methacryloyl chloride (7 mL, 1.035 g/mL, 104.17 g/mol, 69.55 mmol, 2 equivalents) was slowly added drop-wise via an argon purged syringe (over a period of about 2 minutes). The solid slowly dissolved to yield a clear solution. This mixture was stirred for one hour at −10° C. and then stirred overnight at 0° C. The next morning the THF mixture was washed (using a separatory funnel) with equal volumes of: deionized water (×1), sodium bicarbonate saturated aqueous solution (2×), and saturated brine (×1). The THF solution was then dried over $MgSO_4$, filtered (to remove $MgSO_4$) and the solvent was removed by vacuum. The product was an orange oil (10.7742 g, 87.7% yield), and it was stored in the freezer. NMR analysis indicated that the product contained only a trace of methacrylic acid.

Example 3

Reaction of the di-alkoxide with methacrylic anhydride

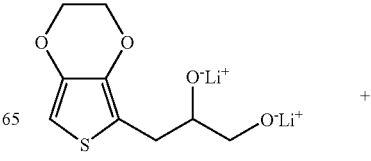

Scheme 4

-continued

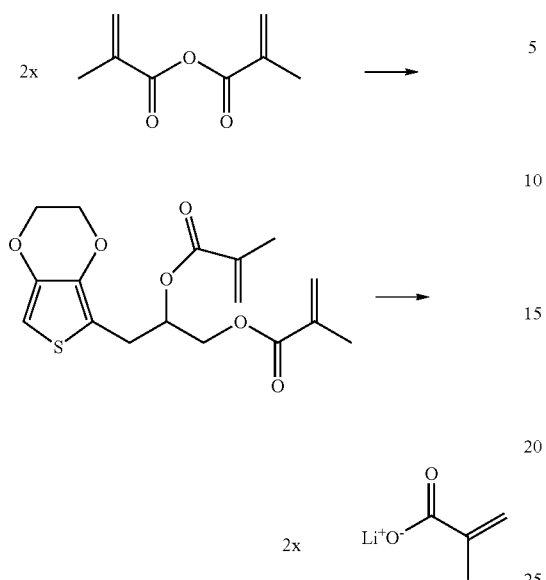

Scheme 4 illustrates reaction of the di-alkoxide with methacrylic anhydride. The di-alkoxide (5.657 g, 228.09 g/mol, 24.80 mmol) was added to 50 mL of anhydrous THF (Aldrich 99.9%, 401757) in a Schlenk flask. A yellow solution formed (free of solids). The mixture was cooled in an ice-water bath during the addition of methacrylic anhydride (10 mL, 1.035 g/mL, 154.17 g/mol, 67.13 mmol, 2.70 equivalents) via an argon purged syringe. The mixture became warmer nearly immediately, but initially there was no solid observed. This mixture was stirred in the dark overnight at room temperature. By the next morning a significant amount of precipitate (lithium methacrylate) was formed. Next, an equal volume of deionized water was added to the THF. The product was extracted with an equal volume of methylene chloride, and treated with an equal volume of acid (HCl, 5 ml concentrated, 37%, HCl in 50 ml water (1×), water (1×), and sodium bicarbonate saturated solution (1×). A fine emulsion formed with the addition of the sodium bicarbonate solution. Salt was added to break the emulsion. The mixture was left overnight to separate into two phases. The methylene chloride phase was isolated and dried over MgSO$_4$, then filtered using #4 filter paper. Methylene chloride was removed by vacuum (rotovap at 40° C.) until only about 3 g of solvent remained. This remaining solvent was removed by vacuum using a Schlenk line. The product was an orange oil (7.5771 g, 87% yield), and it was stored in the freezer. NMR analysis indicated that the recovered material was 50 mol % desired product and 50 mol % methacrylic acid. (The product's molecular weight is 352 g/mol, while methacrylic acid is 86 g/mol). The recovered material was 81 wt % of the desired product. The material obtained can be used without further purification. Starting methacrylic acid can be removed if desired by wet gel purification methods as described in concurrently filed U.S. application Ser. No. 10/954,621

Example 4

Reaction of the Di-Alkoxide with 2-ethylhexanoyl chloride

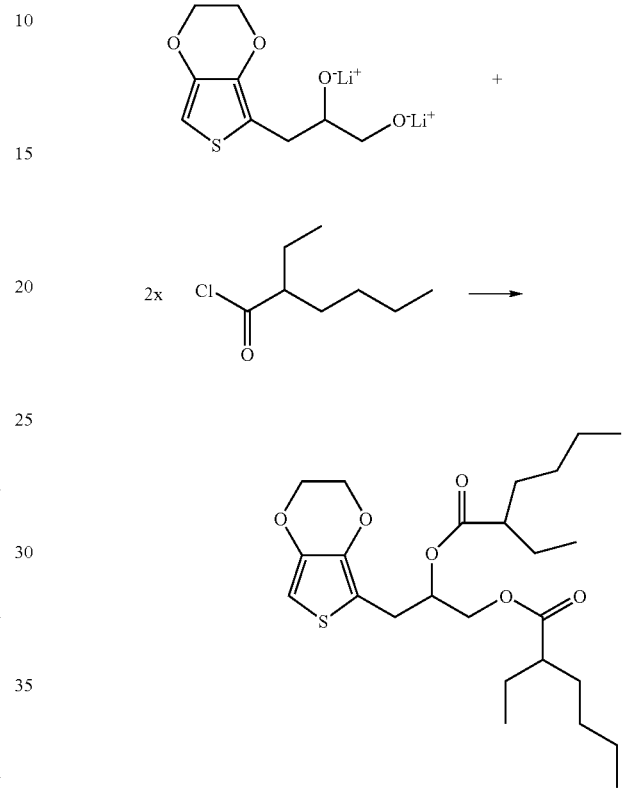

Scheme 5 illustrates reaction of the Di-Alkoxide with 2-ethylhexanoyl chloride. The di-alkoxide from Example 1 (1.2107 g, 228.09 g/mol, 5.3079 mmol) was added to 8.5053 g anhydrous THF (Aldrich 99.9%, 401757) in a 20 mL vial. Next, 2-ethylhexanoyl chloride (1.8559 g, 162.66 g/mol, 11.409 mmol) was added to the vial and the contents were mixed. A clear amber solution formed. A small amount of white precipitate formed. This mixture was stirred for 16 hours, then 7 mL of deionized water was added and thoroughly mixed. Upon settling, the solution formed two phases (layers). The vial was centrifuged to better separate the two layers and the lower aqueous layer was removed by pipet. Next the organic product layer was washed with an equal volume of saturated sodium bicarbonate water solution. A while precipitate formed in the aqueous layer. The top organic layer was removed by pipet. A small amount of hexanes was added to the aqueous layer to extract any remaining product and the hexanes and toluene fractions were combined and dried over MgSO$_4$, then filtered through cotton and placed in a 40 mL vial. The solvent was removed by vacuum with the vial first in an ice water bath, followed by ambient water then warm water. The product was a brown liquid (2.1745 g, 87.4% yield).

Example 5

Reaction Forming an Electrically Conducting Material Using the di-methacrylate Alkoxide Intermediate from Example 2

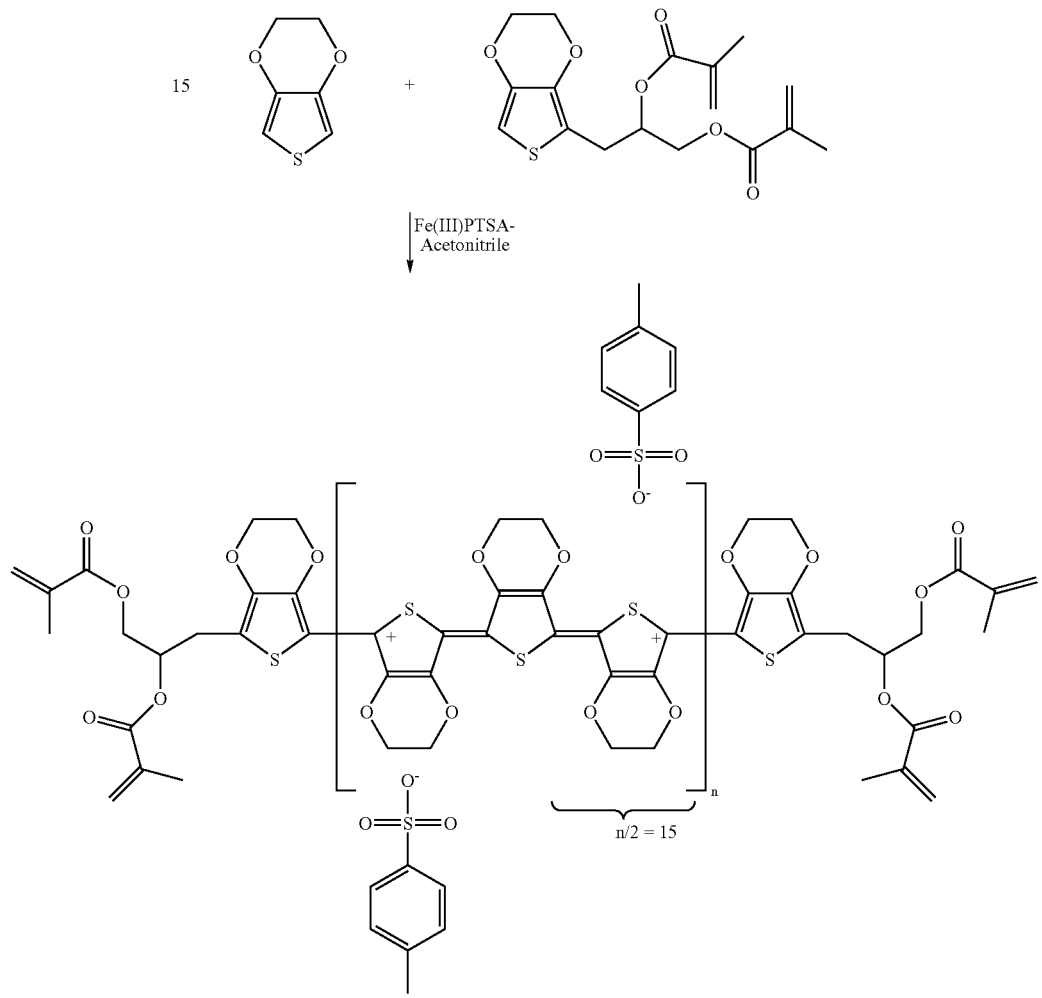

Scheme 6

Scheme 6 illustrates a reaction forming an electrically conducting material using the methacrylate alkoxide intermediate from Example 2. A 12-L, 3 necked round bottom flask was equipped with an overhead mechanical stirrer and an internal thermometer. Iron (III) para-toluenesulfonate hexahydrate (111.0921 g; 677.53 g/mol; 163.966 mmol; Aldrich 462861, batch # 00120EB), which was a fine yellow powder, was added to the flask, followed by 2.4 L of acetonitrile (Aldrich 99.5+%, 360457, ACS Reagent grade, Batch # 09046JB). On stirring, nearly all solids dissolved, giving an orange solution. Next, the dimethacrylate-EDOT intermediate from Example 2 (1.6618 g; 352.38 g/mol; 4.716 mmol) and EDOT (9.9575 g; 142.15 g/mol; 70.049 mmol; Aldrich batch # 06124BB, 483028), and 20 mL acetonitrile (Aldrich, 462861) were mixed in a 40 mL vial. This mixture was added to the 20-L reactor containing the stirring iron (III) para-toluenesulfonate hexahydrate solution. An immediate color change occurred. The first drops produced a greenish-blue streak in the stirring mixture. After about 3 minutes the solution turned dark green, and after 20 minutes it was dark blue. The mixture was stirred for 5 days and then 550 mL of ethanol (95% ethanol/5% isopropanol, EM Science, distributed by Alameda Chemical & Scientific, AX0441-3) was added and stirred into the reaction product mixture. The reaction contents were distributed into six 500 mL plastic centrifuge bottles. The product was purified by repeated washing and centrifugation with ethanol (Alameda Chemical & Scientific, AX0441-3). The first centrifugation step was performed at 4,000 RPM for 25 minutes using a Beckman model J2-21 centrifuge. The supernatant was carefully poured off, leaving a wet plug of the product material. For each washing step 350 mL of ethanol was added to each 500 mL centrifuge bottle and agitated to re-disperse the solid product (a gel). The product was re-centrifuged at 4,000 RPM for 25 minutes for a total of 3 to 4 more times (each time adding 350 mL of ethanol and re-dispersing the solid). The initially centrifuged material had a supernatant that was dark green, and during washing steps 2 through 3 the supernatant color became more transparent. The final washing step had a pale-dark blue supernatant. A total of 78.0917 g of wet gel were recovered (11.76% solids; 9.186 g dry product). The product (wet plug) was then dispersed in either nitromethane or propylene carbonate to form a dispersion with 0.5 weight % solids and was sonicated for 30 minutes (in a mild sonication bath). In an alternative method, the purified wet plug (from the centrifuge) can be completely dried to a solid and re-dispersed in propylene carbonate with extended mild sonication (up to 12 hours in a mild sonication bath), or stirred for 24 hours using a magnetic stir bar, followed by mild sonication for 1 hour.

A 1.3 cm diameter disk pellet of the dry solid was made using a hydraulic press (5,000 to 10,000 pound force) and the bulk conductivity was measured by a 4-point probe. The conductivity was 0.1 S/cm. Spin coated films made from the 0.5% solution in nitromethane (400 RPM on glass or polycarbonate) have a surface resistance of 1-10 M ohm square.

Example 5b

Alternative Purification Method for Example 5

Example 5 was repeated to the point where the reaction mixture was stirred for 5 days and 550 mL of ethanol was added to the acetonitrile mixture in the 12-L flask. Instead of centrifuging the product, it was purified by diafiltration. 100 mL of the reaction mixture was removed (after vigorous stirring to insure uniform distribution of the solid particles) and placed in a 400 mL Millipore dead-end filtration stirred cell equipped with a Durapore® membrane filter (polyvinylidene fluoride 0.22 micron pore size). Under 10 psi applied pressure the 100 mL of product was washed with 700 mL of ethanol under constant volume (diafiltration) conditions. After 700 mL had been added to the filter stirred-cell, the volume was allowed to reduce (dead-end filtration conditions) until only a wet solid cake remained on the filter. The cake (dark-blue product) was readily removed from the membrane with solvents including ethanol, nitromethane and propylene carbonate. 0.1957 g of purified solid product were recovered from the 100 mL sample of crude product in acetonitrile.

Example 6

Reaction Forming an Electrically Conducting Material Using the di-methacrylate Alkoxide Intermediate from Example 3

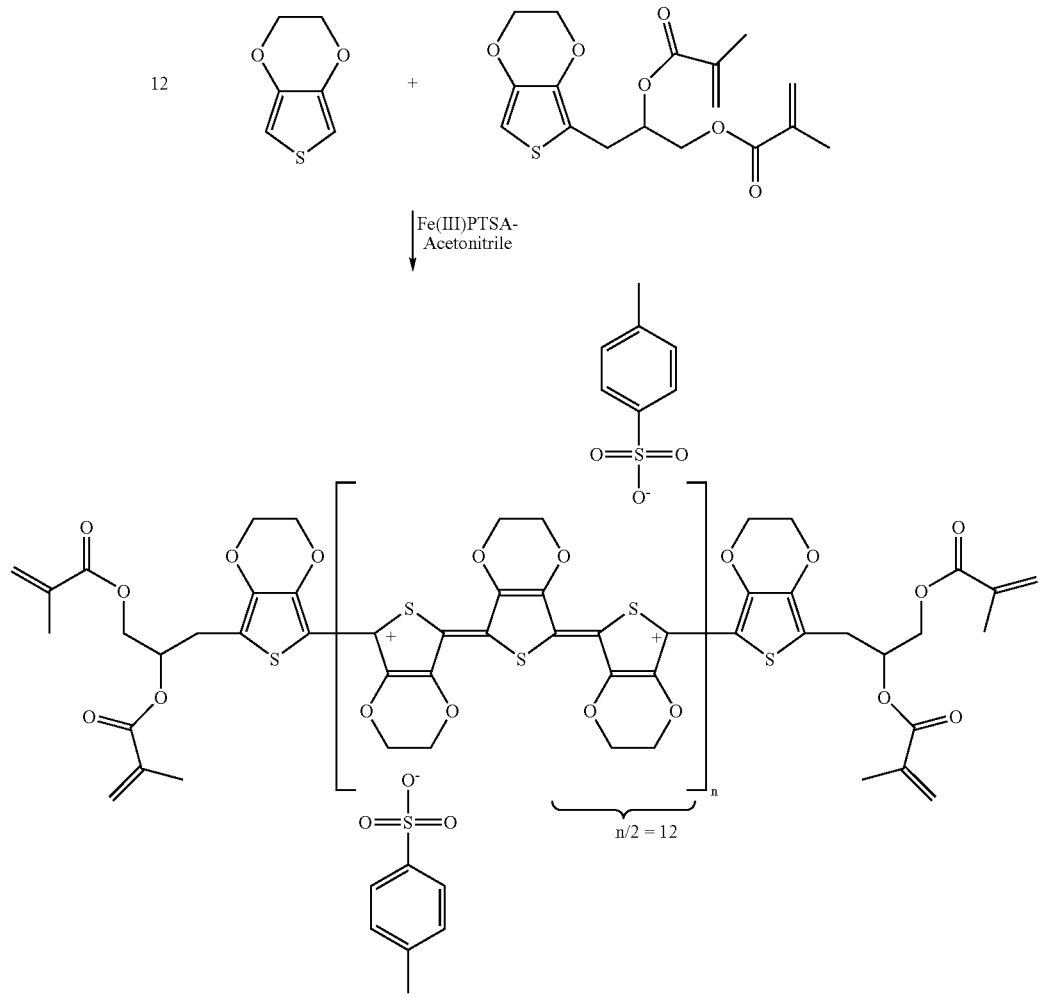

Scheme 7 illustrates a reaction forming an electrically conducting material using the di-methacrylate alkoxide intermediate from Example 3. A 5-L, 3 necked round bottom flask was equipped with an overhead mechanical stirrer and an internal thermometer. To the flask was added Iron (III) para-toluene sulfonate hexahydrate (96.925 g; 0.1430 mol; Aldrich 462861, batch # 00120EB), which was a fine yellow powder. To this was added 2.31 L acetonitrile (Aldrich 99.5+%, 360457, ACS Reagent grade, Batch # 09046JB). On stirring, most of the solid dissolved, giving an orange solution. The remaining solid settled quickly, and formed a few clumps in addition to free powder. Next, a mixture of the dimethacrylate alkoxide intermediate from Example 3 (2.2014 g oil containing 1.7919 g active ingredient; 5.085 mmol) and EDOT (8.6305 g; 60.645 mmol; Aldrich batch # 06124BB, 483028) was prepared in a 40 mL vial. The mixture was dissolved in 30 mL acetonitrile (Aldrich, 462861), and then added by pipette to the stirred iron solution. An immediate color change occurred. The first drops produced a greenish-blue streak in the stirred mixture. By the end of the addition (~1 min), the reaction mixture was dark (brownish-black). After 10 min of reaction, the mixture was dark navy blue, and there appeared to be no more undissolved iron salt floating in the solution. The starting temperature of the mixture was 19° C. After 15 min, the temp was 21° C., and 24° C. after 4 hours. After 4 hours, a blue crust had formed around the top of the reaction mixture on the sides of the flask and on the thermometer.

After 5 days of mixing, 1 L of ethanol (95% ethanol/5% isopropanol, EM Science, distributed by Alameda Chemical & Scientific, AX0441-3) was added to the reaction flask. The blue precipitate (appeared to be gel particles) broke apart upon ethanol addition. A 40 mL sample was removed for initial testing and purification. The sample was centrifuged (3,000 RPM for 10 minutes), re-dispersed in ethanol and centrifuged a total of four times. The final ethanol wash solution was dark blue (initial washes were dark green/yellow. The ethanol gel (7.57% solid) was readily dispersed in propylene carbonate or nitromethane.

The 3.5 Liters of product was then purified in a similar manner using a larger centrifuge. Slightly more than half of the product was dispensed into six 500 mL centrifuge plastic bottles. These bottles were centrifuged at 4,000 RPM for 20 minutes and the supernatant was poured off. The bottles were next filled with the remaining product so that all of the product (solids) was contained in these six bottles. The gel was re-dispersed in ethanol, centrifuged and separated from the supernatant a total of 4 times (not including the two steps required to get the product into six bottles). After the first wash the product was combined and placed into only two of the bottles. The final ethanol wash was dark blue. The yield was 62.98 g of gel (7.57% solid, 4.76 g dry polymer).

The gel was added to solvents to test for dispersibility. 6.6 g of gel (0.05 g solid) was added to 93.4 g of one either propylene carbonate, nitromethane, acetone, chloroform, or MEK. The product formed excellent dispersions in propylene carbonate and nitromethane. No sonication is required to make a dispersion from the wet gel. The dry polymer can be dispersed into propylene carbonate with mild sonication for extended periods of time.

The dry solid conducting product had a bulk conductivity of 0.052 S/cm (determined by 4-point measurement of a pressed pellet). Spin coated films made from the 0.5% solution in nitromethane (400 to 600 RPM) had a surface resistance of 9.9 M ohm/square.

Example 7

Reaction Forming an Electrically Conducting Material Using the di-ethylhexanoyl alkoxide Intermediate from Example 4

Scheme 8

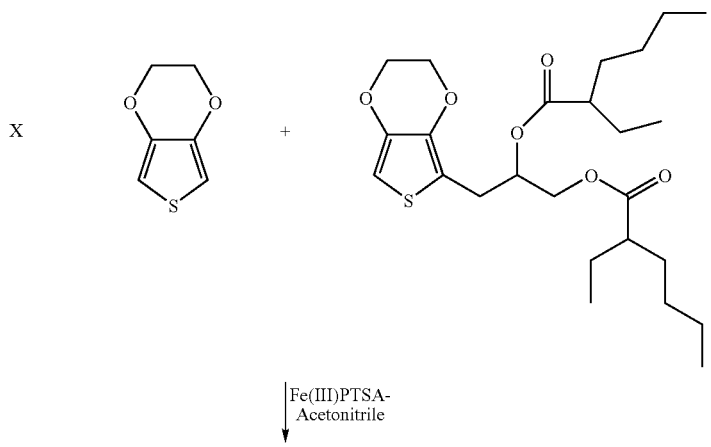

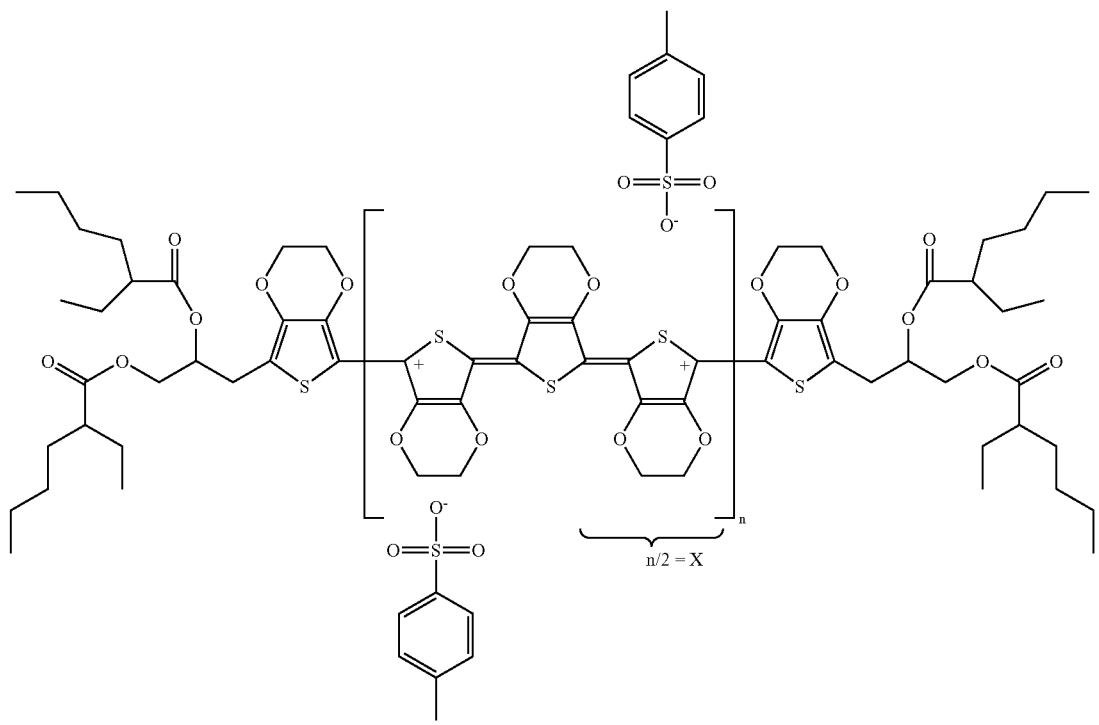

Scheme 8 illustrates a reaction forming an electrically conducting material using the di-ethylhexanoyl alkoxide intermediate from Example 4. A 200 mL round bottom flask was equipped with a magnetic stir-bar and situated over an magnetic stirrer. Iron (III) para-toluenesulfonate hexahydrate (4.7227 g; 677.53 g/mol; 6.970 mmol; Aldrich 462861, batch # 00120EB), which was a fine yellow powder, was added to the flask, followed by 120 mL of acetonitrile (Aldrich 99.5+%, 360457, ACS Reagent grade, Batch # 09046JB). On stirring, all solids dissolved, giving an orange solution. Next, the diethylhexanoyl-EDOT intermediate from Example 4 (0.0965 g; 468.65 g$\mu$mol; 0.2059 mmol), EDOT (0.4243 g; 142.15 g/mol; 2.984 mmol; Aldrich batch # 06124BB, 483028), and 2 mL acetonitrile (Aldrich, 462861) were mixed in a 10 mL vial. The mixture was added to the 200 mL flask containing the stirring iron (III) para-toluenesulfonate hexahydrate solution. An immediate color change occurred. After five minutes of stirring the solution was dark green. It eventually turned dark blue. The mixture was stirred for 6 days and then transfer to three 40 mL vials and centrifuged at 3000 RPM. The supernatant was pale dark blue. The supernatant was carefully poured off leaving the wet solid plug, which was washed and re-centrifuged a total of 8 times with ethanol (95% ethanol/5% isopropanol, EM Science, distributed by Alameda Chemical & Scientific, AX0441-3). The color of the supernatant progressed to dark green, then yellow, light blue, and finally dark blue. 9.4094 g of the purified wet gel product was recovered. A sample of the gel (2.0740 g) was removed and completely dried yielding 0.3743 g of dry product (the electrically conducting material). Thus, the wet gel contained 3.9% solids. The gel was readily dispersed into nitromethane or propylene carbonate to form liquid mixtures that contained between 0.1 and 2 weight % solids.

A 1.3 cm diameter disk pellet of the dry solid product was made using a hydraulic press (5,000 to 10,000 pound force) and the bulk conductivity was measured by a 4-point probe. The conductivity was 0.42 S/cm.

Example 8

Reaction Forming an Electrically Conducting Material Using the di-ethylhaxanoyl alkoxide Intermediate from Example 4

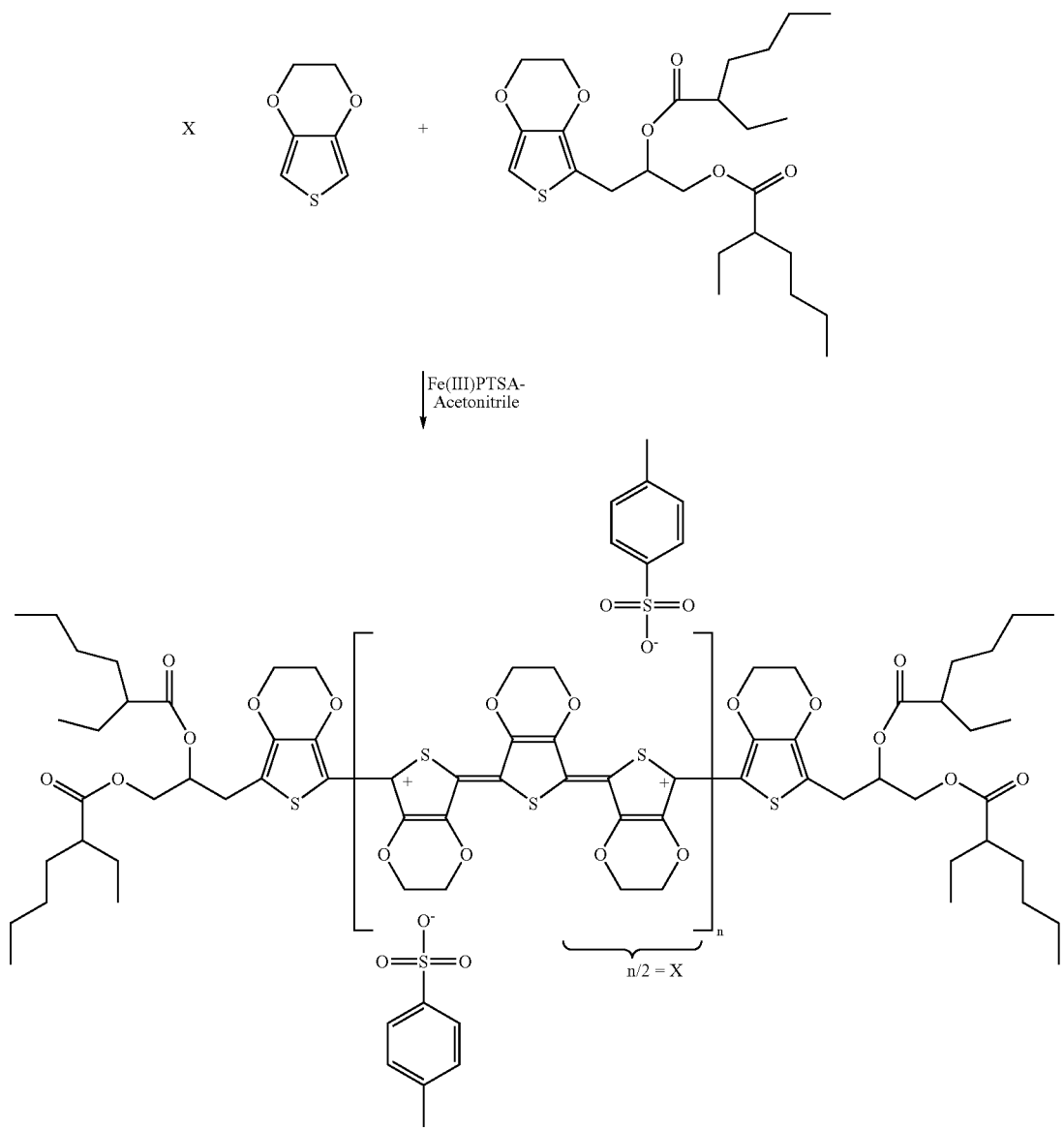

Scheme 9 illustrates a reaction forming an electrically conducting material using the di-ethylhaxanoyl alkoxide intermediate from Example 4. A 500 mL round bottom flask was equipped with a magnetic stir-bar and situated over an magnetic stirrer. Iron (III) para-toluenesulfonate hexahydrate (19.9883 g; 677.53 g/mol; 29.502 mmol; Aldrich 462861, batch # 00120EB), which was a fine yellow powder, was added to the flask, followed by 234.5 g of acetonitrile (Aldrich 99.5+%, 360457, ACS Reagent grade, Batch # 09046JB). On stirring, all solids dissolved, giving an orange solution. Next, the diethylhexanoyl-EDOT intermediate from Example 4 (0.3059 g; 468.65 g/mol; 0.6527 mmol), EDOT (1.7830 g; 142.15 g/mol; 12.543 mmol; Aldrich batch # 06124BB, 483028), and 4 mL acetonitrile (Aldrich, 462861) were mixed in a 10 mL vial. The mixture was added to the 500 mL flask containing the stirring iron (III) para-toluenesulfonate hexahydrate solution. An immediate color change occurred. After five minutes of stirring the solution was dark green. It eventually turned dark blue. After three days the mixture was a thick gel and 110 g of ethanol (95% ethanol/5% isopropanol, EM Science, distributed by Alameda Chemical & Scientific, AX0441-3) was added and stirred into the product mixture. This thinned the contents of the flask to a flowing liquid. The product was transferred to a 500 mL plastic centrifuge bottle and centrifuged at 4,000 RPM for 25 minutes in a Beckman model J2-21 centrifuge. The supernatant was poured off leaving a 34.395 g wet gel plug. The gel was re-dispersed by adding 250 g of ethanol, and centrifuged again at 4,000 RPM for 25 minutes. The supernatant was poured off (leaving 31.976 grams of solid gel). The gel was re-dispersed in 250 g of ethanol, centrifuged (4,000 RPM) and the supernatant was removed. This process was repeated for a total of six centrifuge steps. The final supernatant was light blue and the final gel weight was 26.3417 g. A sample of the gel was removed and completely dried to determine the percent solids. The gel was 8.63% solids, thus the reaction yielded 2.2735 g of the solid conducting product. The gel was easily dispersed into nitromethane or propylene carbonate to form liquid mixtures that contained between 0.1 and 2 weight % solids.

A 1.3 cm diameter disk pellet of the dry solid product was made using a hydraulic press (5,000 to 10,000 pound force) and the bulk conductivity was measured by a 4-point probe. The conductivity was 0.81-S/cm.

Example 9

Reaction Forming an Electrically Conducting Material Using the di-ethylhexanoyl alkoxide Intermediate from Example 4

Scheme 10 illustrates a reaction forming an electrically conducting material using the di-ethylhexanoyl alkoxide intermediate from Example 4. A 250 mL round bottom flask was equipped with a magnetic stir-bar and situated over a magnetic stirrer. Iron (III) chloride hexahydrate (9.9747 g; 270.30 g/mol; 36.902 mmol; Aldrich) was added to the flask, followed by 170 mL of acetonitrile (Aldrich 99.5+%, 360457, ACS Reagent grade, Batch # 09046JB). Next, the diethylhenxanoyl-EDOT intermediate from Example 4 (0.3452 g; 468.65 g/mol; 0.7365 mmol), EDOT (2.0788 g; 142.15 g/mol; 14.624 mmol; Aldrich batch # 06124BB, 483028), and 4 mL acetonitrile (Aldrich, 462861) were mixed in a 10 mL vial. The mixture was added to the 250 mL flask containing the stirring iron (III) chloride hexahydrate solution. The solution darkened immediately. After five days of mixing 75 mL of ethanol (95% ethanol/5% isopropanol, EM Science, distributed by Alameda Chemical & Scientific, AX0441-3) was added and stirred into the product mixture. The product was purified by centrifuging at 4,000 RPM for 25 minutes and pouring off the supernatant. This washing process was repeated 5 times until the supernatant solution became dark blue. The final solid gel plug (from the centrifuge step) was dried and the conductivity was measured.

A 1.3 cm diameter disk pellet of the dry solid product was made using a hydraulic press (5,000 to 10,000 pound force) and the bulk conductivity was measured by a 4-point probe. The conductivity was 2.1 S/cm.

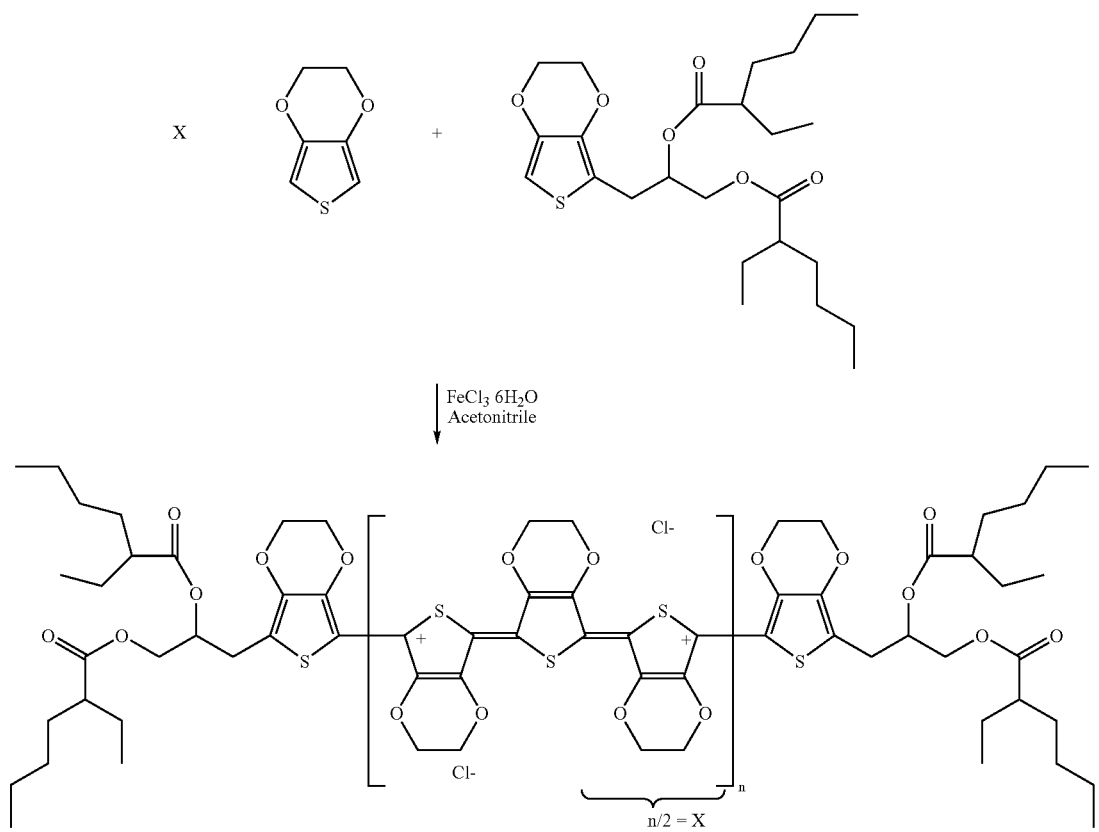

Scheme 10

Example 10
Michael Addition of Polymeric Monoamines to the Methacrylate Conducting Material of Example 6
Scheme 11
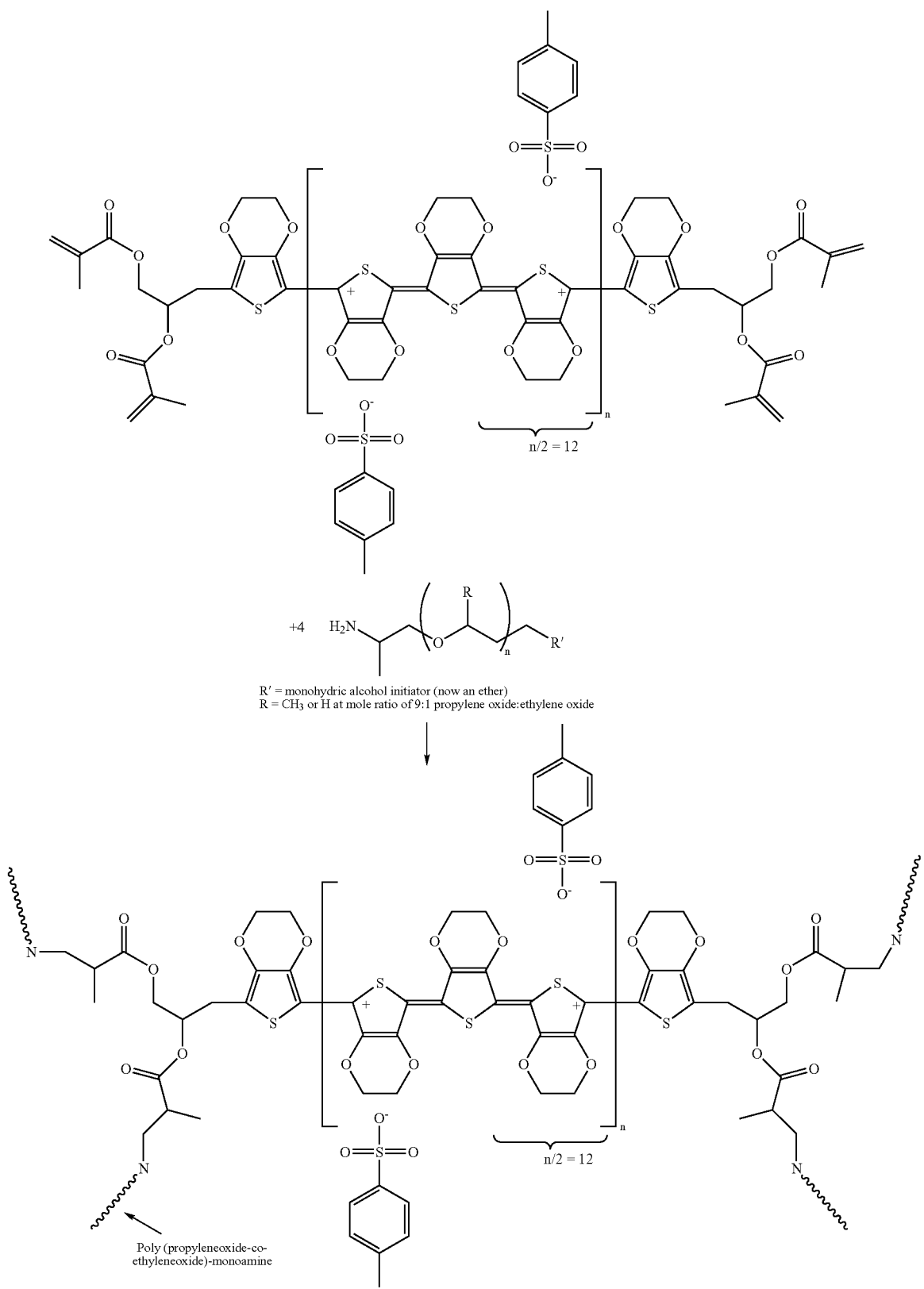

Scheme 11 illustrates Michael addition of polymeric monoamines to the methacrylate conducting material of Example 6. The purified and dried solid conducting product from Example 6 was completely dried by vacuum. The dried solid product from Example 6 (0.0286 g) was re-dispersed in 5.72 g of propylene carbonate (Aldrich) with 45 minutes of mild sonication (using a Branson model 3510 sonicator). This produced a 0.5 weight % dispersion with a deep sky-blue color. The tetramethacryalate end-capped oligomer of EDOT produced in Example 6 has an average methacrylate equivalent weight of 1358 g/mol. Thus there are 0.02106 mmol methacrylate bonds in the 0.0286 g of oligomer used in this example. A poly(propyleneoxide-co-ethyleneoxide)-monoamine (0.0172 g, Jeffamine® XTJ-505, 600 g/mol, average propyleneoxide to ethyleneoxide ratio of 9:1, monoamine-terminated, 1.36 equivalents based on methacrylates) was added to the propylene carbonate dispersion in a 40 mL vial and sonicated for 10 minutes. The amine terminated polymers reacted with the methacrylate bonds via a Michael-type addition. The FTIR spectrum of the Michael-addition product confirmed the reaction by the loss of the methacrylate absorbances at 1640 and 810 $cm^{-1}$. The conversion of the methacrylate to the amine-adduct was 60%.

Example 11

Reaction Forming an Electrically Conducting Material Using the di-methacrylate alkoxide Intermediate from Example 3

A glass flask was equipped with a magnetic stirrer. To the flask was added Iron (III) perchlorate trihydrate (2.0 g, 354.20 g/mol, 5.64 mmol). To this was added 50 mL acetonitrile (Aldrich 99.5+%, 360457, ACS Reagent grade, Batch # 09046JB). On stirring the solid dissolved. Next, a mixture of the dimethacrylate alkoxide intermediate from Example 3 (0.0612 g oil containing 0.0498 g active ingredient; 0.1412 mmol) and EDOT (0.2772 g; 1.948 mmol; Aldrich batch # 06124BB, 483028) was prepared in a 40 mL vial. The mixture was dissolved in 10 mL acetonitrile (Aldrich, 462861), and then added by pipette to the stirred iron solution. An immediate color change occurred. After 10 min of reaction, the mixture was dark navy blue.

After 1 day of mixing, 20 mL of ethanol (95% ethanol/5% isopropanol, EM Science, distributed by Alameda Chemical & Scientific, AX0441-3) was added to the reaction flask. The product was then purified using washing (ethanol) and centrifugation. The final ethanol wash was dark blue.

The gel was easily dispersed in propylene carbonate or nitromethane. The dry polymer can be dispersed into propylene carbonate with mild sonication for extended periods of time. The product was dried and the conductivity was measured by the four-point technique. The bulk conductivity was 52 S/cm.

Example 12

Photocrosslinking a Composition Containing a Branched End-Capped Conducting Oligomer (p-toluenesulfonate Doped) Containing Latent Polymerizable Groups The material from Example 5 was collected and dispersed in propylene carbonate to form a 0.5% (solids) dispersion. The dispersion was treated with mild sonication for one hour. A separate solution of poly(ethyleneglycol 200 diacrylate) with 4 wt % 2,2-dimethoxy-2-phenyl acetophenone (DMPA) was prepared. The propylene carbonate dispersion and the poly(ethyleneglycol 200 diacrylate) solution were combined (1:1/volume:volume), mixed with stirring and then sonicated for 10 minutes. A thin film of this mixture was pressed between two glass microscope slides (one of the slide surfaces was treated with a alky-silane releasing agent). The film sample was then exposed to ultraviolet light (5,000 $mW/cm^2$, 320-500 nm) for 10 seconds. The top microscope slide (the one with the releasing agent) was removed and the film was allowed to dry for two days. The sheet resistance of the film was 20 to 100 M Ohm/square.

Example 13

Photocrosslinking a Composition Containing a Branched End-Capped Conducting Oligomer (Perchlorate Doped) Containing Latent Polymerizable Groups The material from Example 11 was collected and dispersed in propylene carbonate to form a 4.0% (solids) dispersion. The dispersion was treated with mild sonication for one hour. A separate solution of poly(ethyleneglycol 200 diacrylate) with 3 wt % 2,2-dimethoxy-2-phenyl acetophenone (DMPA) was prepared. The propylene carbonate dispersion and the poly(ethyleneglycol 200 diacrylate) solution were combined (1:1/volume:volume), mixed with stirring and then sonicated for 10 minutes. A thin film of this mixture was pressed between two glass microscope slides (one of the slide surfaces was treated with a alky-silane releasing agent). The film sample was then exposed to ultraviolet light (5,000 $mW/cm^2$, 320-500 nm) for 10 seconds. The top microscope slide (the one with the releasing agent) was removed and the film was allowed to dry for two days under ambient conditions. The surface resistance was 47.3 Kohm/square. The film was then heated for one hour at 150° C. The surface resistance of the film was 26.4 Kohm/square.

Example 14

Synthesis of di(dodecyl-PEG 870)-EDOT

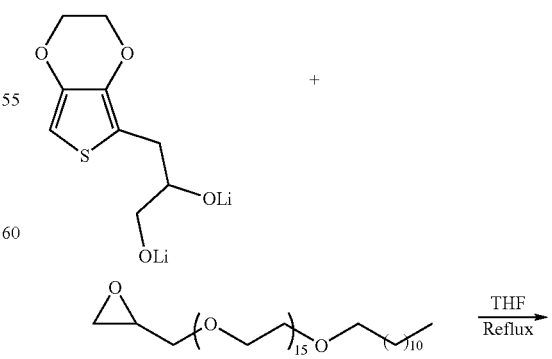

Scheme 12

-continued

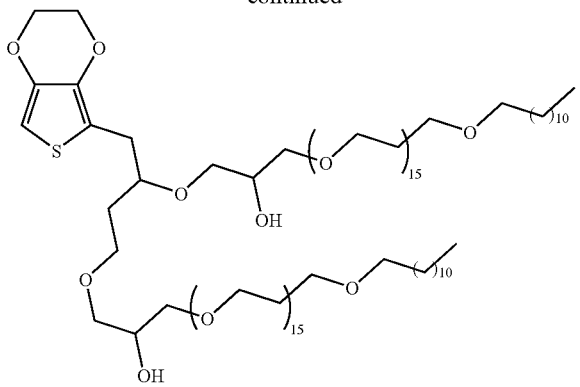

Scheme 12 illustrates synthesis of di(dodecyl-PEG 870)-EDOT. The dialkoxide (1.3 g, 5.4 mmol, 228 g·mol$^{-1}$) was suspended in 10 cm$^3$ of anhydrous THF under an inert argon atmosphere. Two equivalents of the polyether epoxide (Denacol EX-171, 9.8 g, 11.4 mmol, 870 g·mol$^{-1}$) in 40 cm$^3$ of THF was added to the stirred suspension of the dialkoxide. The mixture was gently refluxed overnight. The reaction turned dark brown after 5 hours. After 24 hours of reflux, the reaction was cooled to room temperature and the THF was removed in vacuo. The brown oil was quenched with 0.1 N HCl. The product was extracted with dichloromethane and washed with distilled water. The product was dried with magnesium sulfate and the solvent was removed in vacuo. $^1$H-MNR indicated no unreacted epoxide and an average of two polyether chains per molecule.

Example 15

Synthesis of Hyperbranched hexa(dodecyl-PEG 870)-EDOT

Scheme 13 illustrates synthesis of hyperbranched hexa (dodecyl-PEG 870)-EDOT. Under argon, the EDOT di-alkoxide (0.8 g, 0.004 mol, 1 eq) was slurried in anhydrous 1,4-dioxane and cooled in an ice-salt-bath. Denacol Ex-171 (6.2 g, 0.007 mol, 2 eq) was dissolved first with minimum 1,4-dioxane, then added dropwise to the di-alkoxide slurry. The mixture was stirred and allowed to come to room temperature over the period of 2 hours, then it was slowly heated to reflux and maintained for 3 days at reflux with stirring. At the end of this period the reaction mixture was cooled to room temperature, and the reaction was quenched with cold 1M HCl. The product was isolated by liquid-liquid extraction into an organic phase of dichloromethane. The reaction mixture was extracted with ca. 100 mL of dichloromethane 3 times. These organic phases were combined and washed with 0.1M HCl (ca 100 mL) 3 times then with water in the final wash. The organic layer was dried over MgSO$_4$, and then the solvent removed under vacuum. The product was isolated as a viscous oil that solidified to a waxy solid on standing. $^1$H NMR recorded in CDCl$_3$. $\delta$2.78 (s, 2H); 4.14 (s, 4H); 6.1 (s, 0.9H); 1.53 (m, 13H); 0.84 (t, 20H). Although the above scheme (Scheme 13) shows the branched structure as symmetrically derivatized (with three polyether chains per alkoxide attachment site), the actual structure of the polyether chains and the number of branches per alkoxide site is unknown. What is known is that the integration of proton signals in the NMR spectrum yields an average of six branches per EDOT unit. Statistically there are likely to be more or less than six branches arranged randomly on either alkoxide site for each EDOT unit in the actual material.

Example 16

Production and Purification of hyperbranchedhexa (dodecyl-PEG 870)-poly(block-PEDOT)-hexa(dodecyl-PEG 870) with a 1:1 Weight Ratio of Monomers Scheme 14 illustrates production and purification of hyperbranchedhexa(dodecyl-PEG 870)-poly(block-PEDOT)-hexa(dodecyl-PEG 870) with a 1:1 weight ratio of monomers. Iron(III) perchlorate hydrate (5.16 g, 14.6 mmol) was dissolved in 140 mL of acetonitrile (0.1M solution) in a 250 mL Erlenmeyer flask to form an oxidant solution. EDOT monomer (1 g, 7.0 mmol) and hexa(dodecyl-PEG 870)-EDOT (1 g) were mixed in a vial and diluted with 10 mL of acetonitrile. This monomer mixture was then added to the stirring oxidant solution. The vial was rinsed with acetonitrile and the washings added to the reaction mixture. The color of this mixture changed immediately to dark blue and was accompanied by an increase in viscosity and volume of the mixture. After allowing this mixture to react under vigorous stirring for 48 hours at room temperature, the product was isolated and purified by centrifuging the crude copolymerization mixture at 3000 RPM for 15 minutes. The centrifugation was followed by decanting and washing with acetonitrile. This process was repeated three times. The color of the supernatant ranged from green to blue for each of the successive rinses. This resulted in 41% yield of purified product that was isolated as a wet viscous gel with dark blue color and 3.5 wt. % solids. The pressed pellet DC conductivity of the solid content of the gel was found to be 30 S/cm using standard four-probe conductivity measurement techniques.

From the feeding ratio of the hyperbranched end-capper and the EDOT we can calculate that n in scheme 14 is 9.9.

Example 17

Production and Purification of Hyperbranched hexa (dodecyl-PEG 870)-poly(block-PEDOT)-hexa(dodecyl-PEG 870) with a 1:2 Weight Ratio of EDOT to hexa(dodecyl-PEG 870)-EDOT Scheme 15 illustrates production and purification of hyperbranched hexa(dodecyl-PEG 870)-poly(block-PEDOT)-hexa(dodecyl-PEG 870) with a 1:2 weight ratio of EDOT to hexa(dodecyl-PEG 870)-EDOT. Iron(III) perchlorate hydrate (1.60 g, 4.52 mmol) was dissolved in 45 mL of acetonitrile (0.1M solution) in a 150 mL Erlenmeyer flask to form an oxidant solution. EDOT monomer (0.3 g, 2.11 mmol) and hexa(dodecyl-PEG 870)-EDOT (0.6 g) were mixed in a vial and diluted with 10 mL of acetonitrile. This monomer mixture was then added to the stirring oxidant solution. The vial was rinsed with acetonitrile and the washings added to the reaction mixture. The color of this mixture changed immediately to dark blue and was accompanied by an increase in viscosity and volume of the mixture. After allowing this mixture to react under vigorous stirring for 48 hours at room temperature, the product was isolated and purified by centrifuging the crude copolymerization mixture at 3000 RPM for 15 minutes. The centrifugation was followed by decanting and washing with acetonitrile. This process was repeated three times. The color of the supernatant ranged from green to blue for each of the successive rinses. This resulted in 31% yield of purified product that was isolated as a wet viscous gel with dark blue color and 2.4 wt. % solids. The pressed pellet DC conductivity of the solid content of the gel was found to be 24 S/cm using standard four-probe conductivity measurement techniques.

From the feeding ratio of the hyperbranched end-capper and the EDOT we can calculate that n in scheme 15 is 4.9.

Example 18

Production and Purification of Hyperbranched hexa (dodecyl-PEG 870)-poly(block-PEDOT)-hexa(dodecyl-PEG 870) with a 1:3 Weight Ratio of EDOT to hexa(dodecyl-PEG 870)-EDOT Scheme 16 illustrates production and purification of hyperbranched hexa(dodecyl-PEG 870)-poly(block-PEDOT)-hexa(dodecyl-PEG 870) with a 1:3 weight ratio of EDOT to hexa(dodecyl-PEG 870)-EDOT. Iron(III) perchlorate hydrate (1.65 g, 4.66 mmol) was dissolved in 46 mL of acetonitrile (0.1M solution) in a 150 mL Erlenmeyer flask to form an oxidant solution. EDOT monomer (0.3 g, 2.11 mmol) and hexa(dodecyl-PEG 870)-EDOT (0.9 g) were mixed in a vial and diluted with 10 mL of acetonitrile. This monomer mixture was then added to the stirring oxidant solution. The vial was rinsed with acetonitrile and the washings added to the reaction mixture. The color of this mixture changed immediately to dark blue and was accompanied by an increase in viscosity and volume of the mixture. After allowing this mixture to react under vigorous stirring for 48 hours at room temperature, the product was isolated and purified by centrifuging the crude copolymerization mixture at 3000 RPM for 15 minutes. The centrifugation was followed by decanting and washing with acetonitrile. This process was repeated three times. The color of the supernatant ranged from green to blue for each of the successive rinses. This resulted in 22% yield of purified product that was isolated as a wet viscous gel with dark blue color and 1.8 wt. % solids. The pressed pellet DC conductivity of the solid content of the gel was found to be 14 S/cm using standard four-probe conductivity measurement techniques.

From the feeding ratio of the hyperbranched end-capper and the EDOT we can calculate that n in scheme 16 is 3.3.

Example 19

Characterization of Hyperbranched hexa(dodecyl-PEG 870)-poly(block-PEDOT)-hexa(dodecyl-PEG 870) with a 1:3 Weight Ratio of EDOT to hexa (dodecyl-PEG 870)-EDOT A sample of a conducting ABA-type tri-block copolymer of hexa(dodecyl-PEG 870)-poly(block-PEDOT)-hexa (dodecyl-PEG 870) with a 1:3 weight ratio of EDOT to hexa(dodecyl-PEG 870)-EDOT (Formula 10) was prepared according to the method of Example 17. The resulting purified gel was diluted with nitromethane to a concentration of ca 0.5 wt. %. This dispersion was treated for 30 seconds with a 500 W ultrasonic probe (Cole Parmer) set to an amplitude of 75%. The sonically treated dispersion was then filtered through glass wool, resulting in a dark blue solution that is stable with little or no settling over a period of a few hours. If settling of the material is observed, shaking or sonicating briefly restores good dispersion quality.

Figure 2:
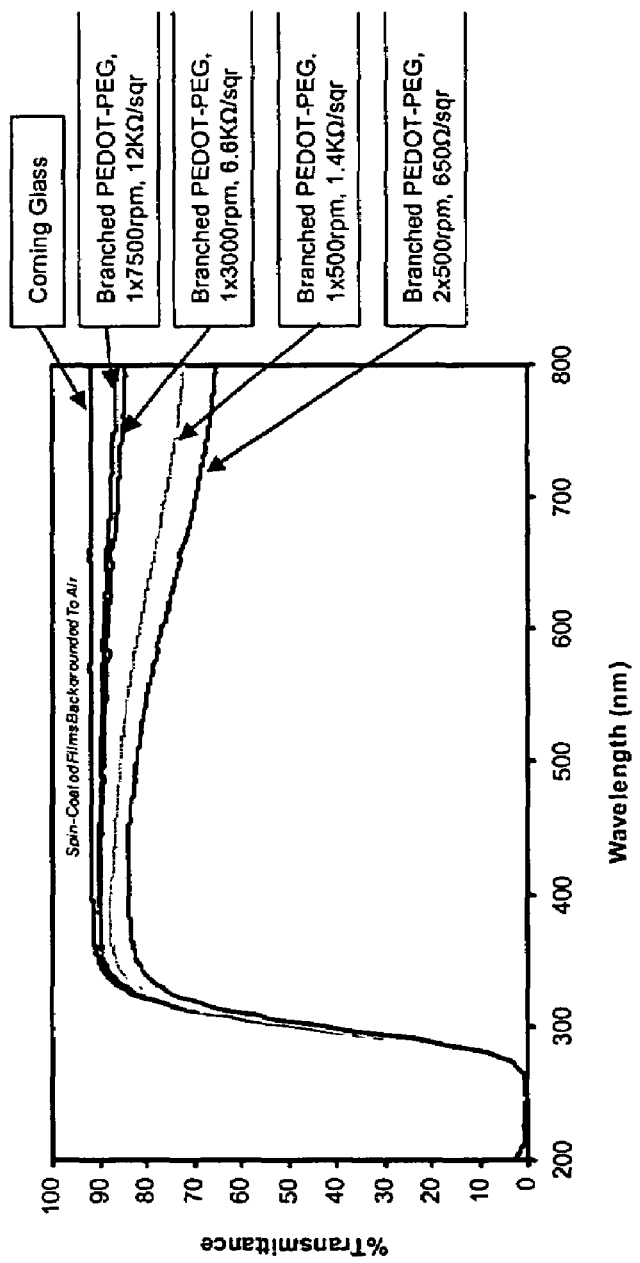
FIG. 2 shows the % Transmittance of spin-cast films of hexa(dodecyl-PEG 870)-poly(block-PEDOT)-hexa(dodecyl-PEG 870) on Corning® glass.

Thin, transparent films of this material were prepared on Corning glass by spin-casting from sonicated, nitromethane dispersions at 0.2 wt. % concentration over a range of speeds (500 to 7500 RPM) using a Chemat spin coating system. The optical transmittance of films from 190 to 820 nm was recorded on a Hewlett Packard diode-array UV-V is spectrophotometer (see FIG. 2). The data are also reported as an average transmittance value from 400 to 800 nm in Table 1 below along with the corresponding sheet resistance. Sheet resistances of films were measured using the standard "square" method by painting silver lines equaling the dimensions of two sides of a perfect square directly onto the sample surface. Resistance values were recorded using a Keithley digital multimeter.

TABLE 1

Data of spin-cast films of hexa(dodecyl-PEG 870)-poly(block-PEDOT)-hexa(dodecyl-PEG 870)

| Spin-Cast Speed (RPM) | Average % T 400-800 nm | Sheet Resistance (kΩ/□) |
|---|---|---|
| 500 | 80.1 | 1.4 |
| 3000 | 87.4 | 6.6 |
| 4300 | 87.3 | 8.0 |
| 7500 | 88.5 | 12 |
| Bare Coring Glass | 91.7 | — |

The Route Mean Square (RMS) surface roughness of a thin film of this material spun at 3000 rpm on float glass was measured with an Atomic Force Microscope with a silicon nitride tip in contact mode. The measured vales were 3.4 nm when taken over a distance of 5 micron, 4.9 nm when averaged over 20 microns, and 3.6 nm when averaged over 35 microns.

Example 20

Production and Purification of PTSA Doped Branched hexa(dodecylPEG870)-EDOT and Preparation of MEK Dispersions Scheme 17 illustrates Production and purification of PTSA doped branched hexa(dodecylPEG870)-EDOT and preparation of MEK dispersions. Iron(III) p-toluene-sulfonate (2.93 g, 4.70 mmol) was dissolved in 46 mL of acetonitrile (0.1M solution) in a 120 mL Erlenmeyer flask to form an oxidant solution. EDOT monomer (0.3 g, 2.11 mmol) and hexa(dodecylPEG870)-EDOT (0.9 g) were mixed in a vial and diluted with 10 mL of acetonitrile. This monomer mixture was then added to the stirring oxidant solution. The vial was rinsed with acetonitrile and the washings added to the reaction mixture. The mixture swelled and the color of the mixture changed slowly from yellow-orange to yellow-green to blue-green. After allowing this mixture to react for 48 hours at room temperature, the product was isolated and purified by centrifuging the crude copolymerization mixture at 3000 RPM for 20 minutes. The centrifugation was followed by decanting and washing with ethanol. This process was repeated three times. The color of the supernatant ranged from green to blue for each of the successive rinses. This resulted in 28.3% yield of purified product that was isolated as a wet gel with a 2.1 wt % solid content. The pressed pellet DC conductivity of the solid content of the gel was found to be $5 \times 10^{-3}$ S/cm using standard four-probe conductivity measurement techniques.

The resulting purified gel was diluted with 2-butanone (methyl ethyl ketone) to a concentration of ca. 0.3 wt. %.

This dispersion was treated for 30 seconds with a 500 W ultrasonic probe (Cole Parmer) set to an amplitude of 75%. The sonically treated dispersion was then filtered through glass wool, resulting in a dark blue solution that is stable with little or no settling over a period of days. If settling of the material is observed, shaking or sonicating briefly restores good dispersion quality.

From the feeding ratio of the hyperbranched end-capper and the EDOT we can calculate that n in scheme 17 is 3.3.

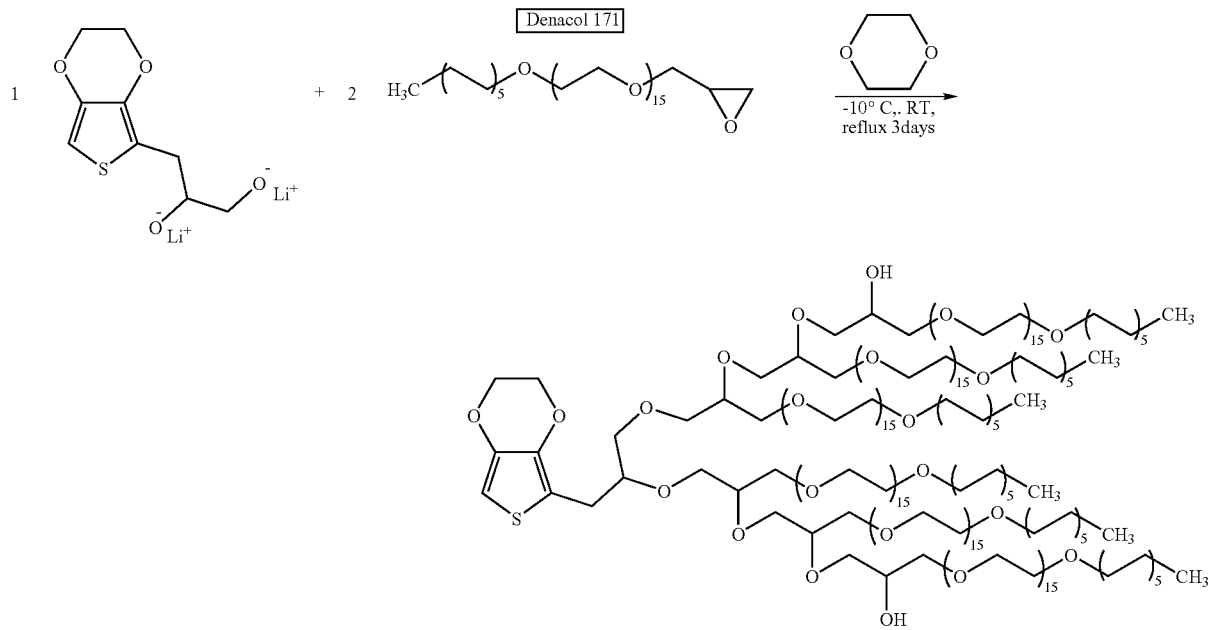

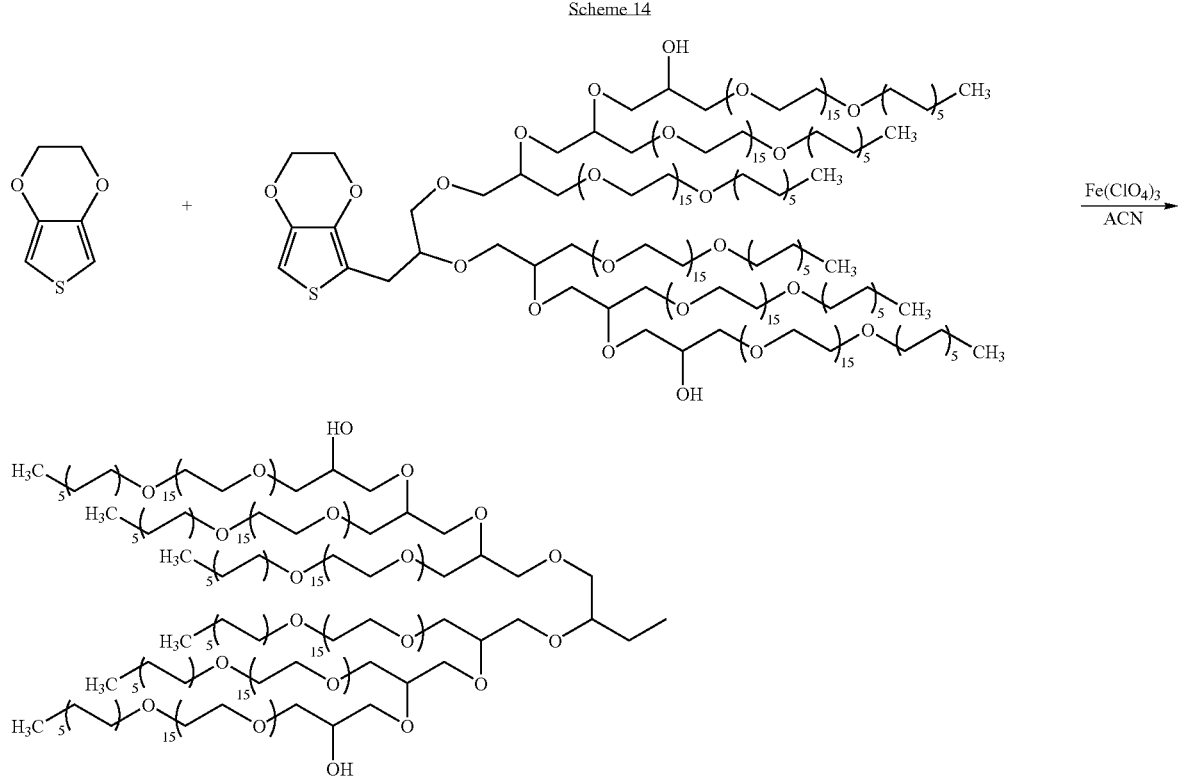

-continued
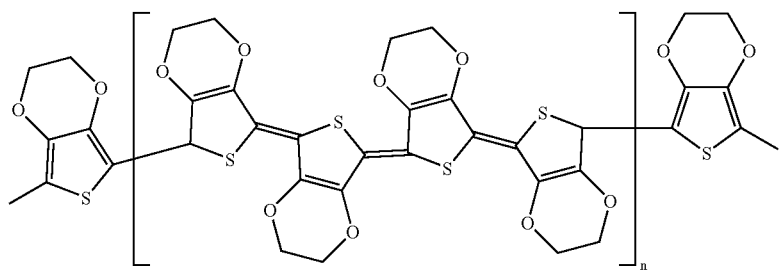
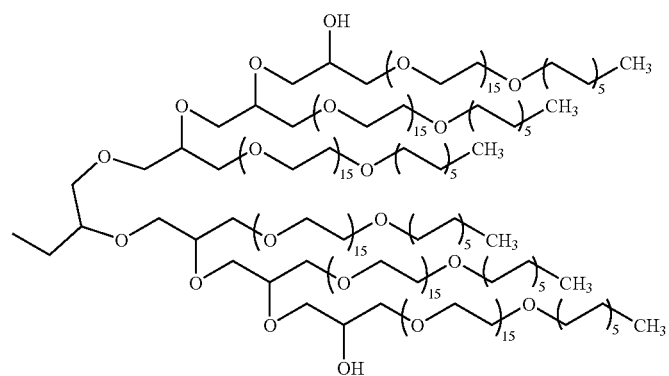
Scheme 15
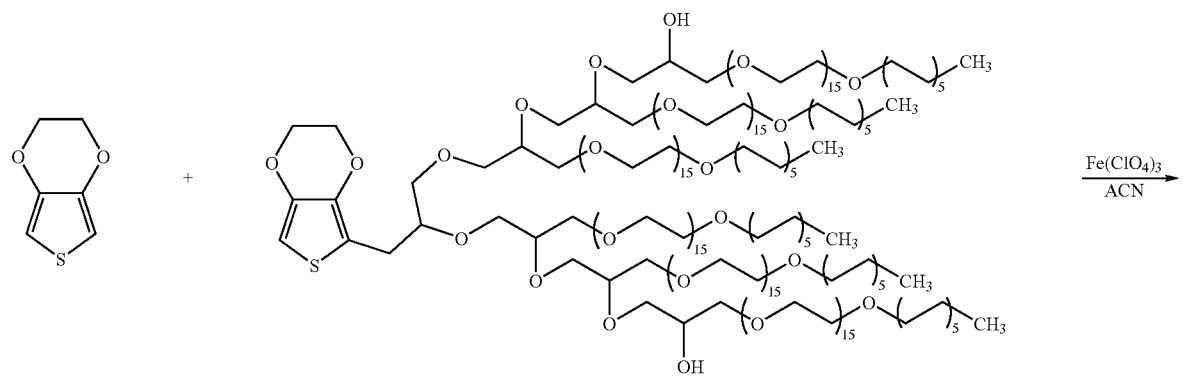
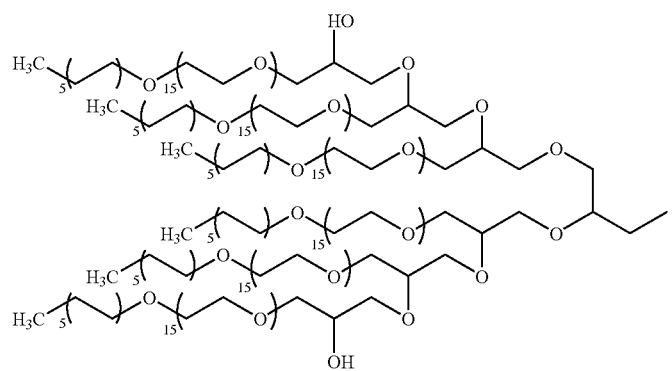

61 62
-continued
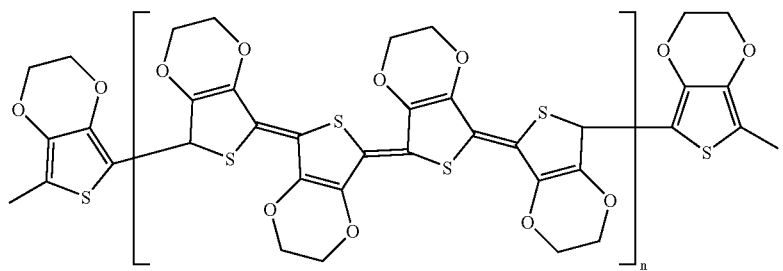
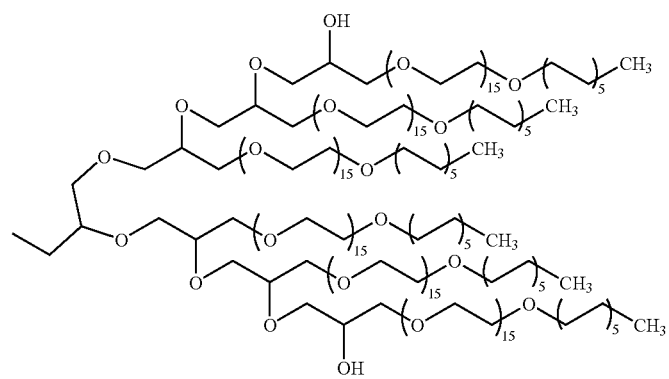
Scheme 16
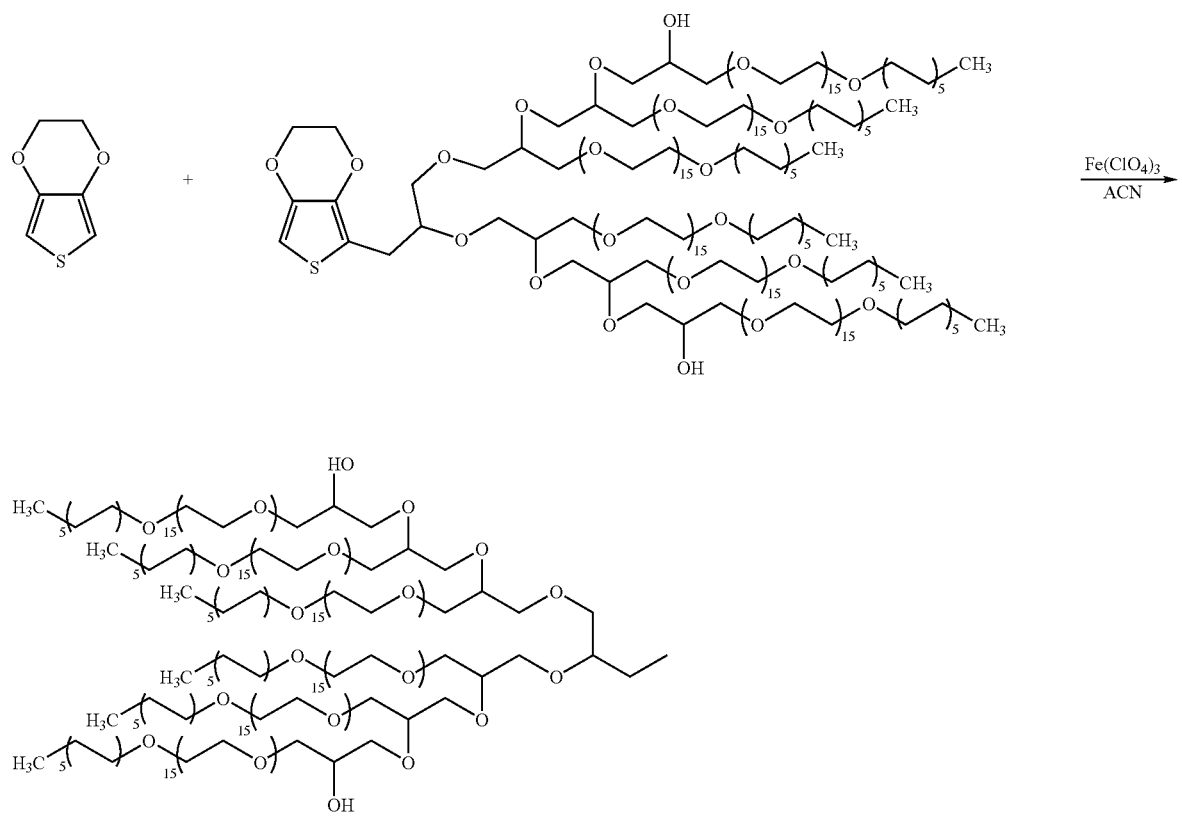

-continued
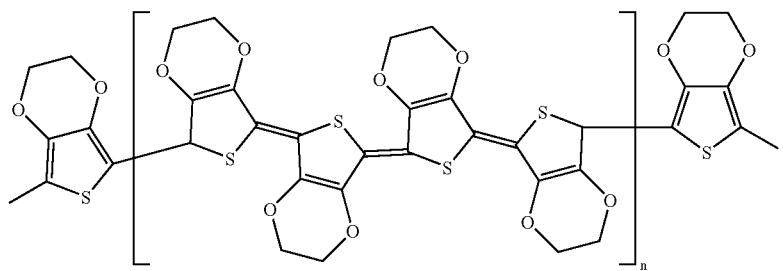
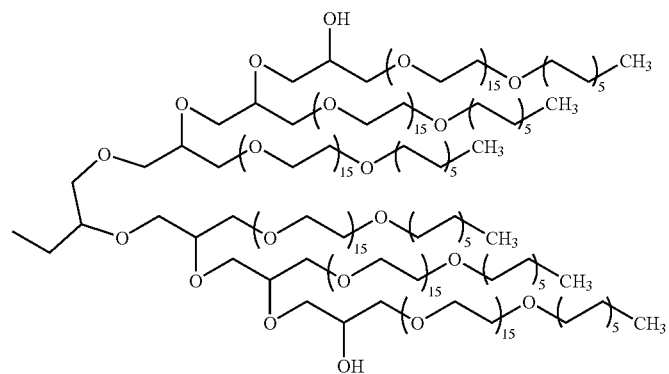
Formula 10
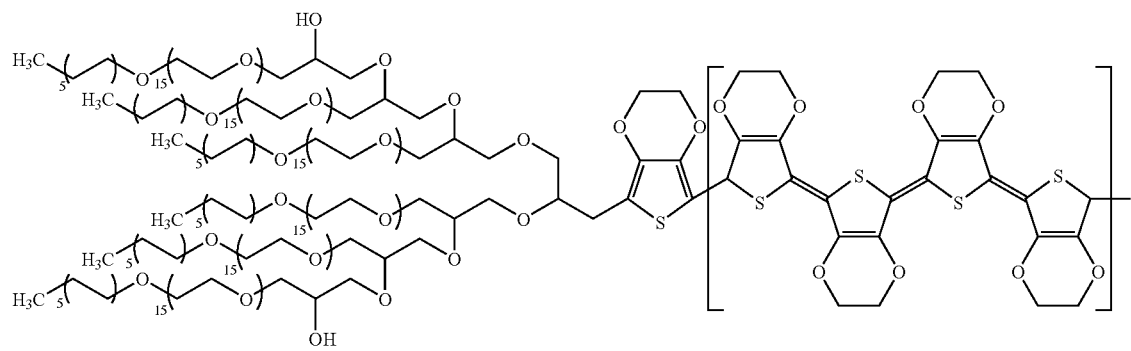
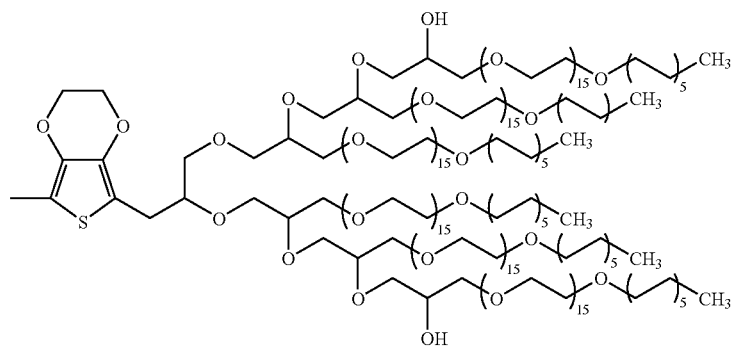

Scheme 17

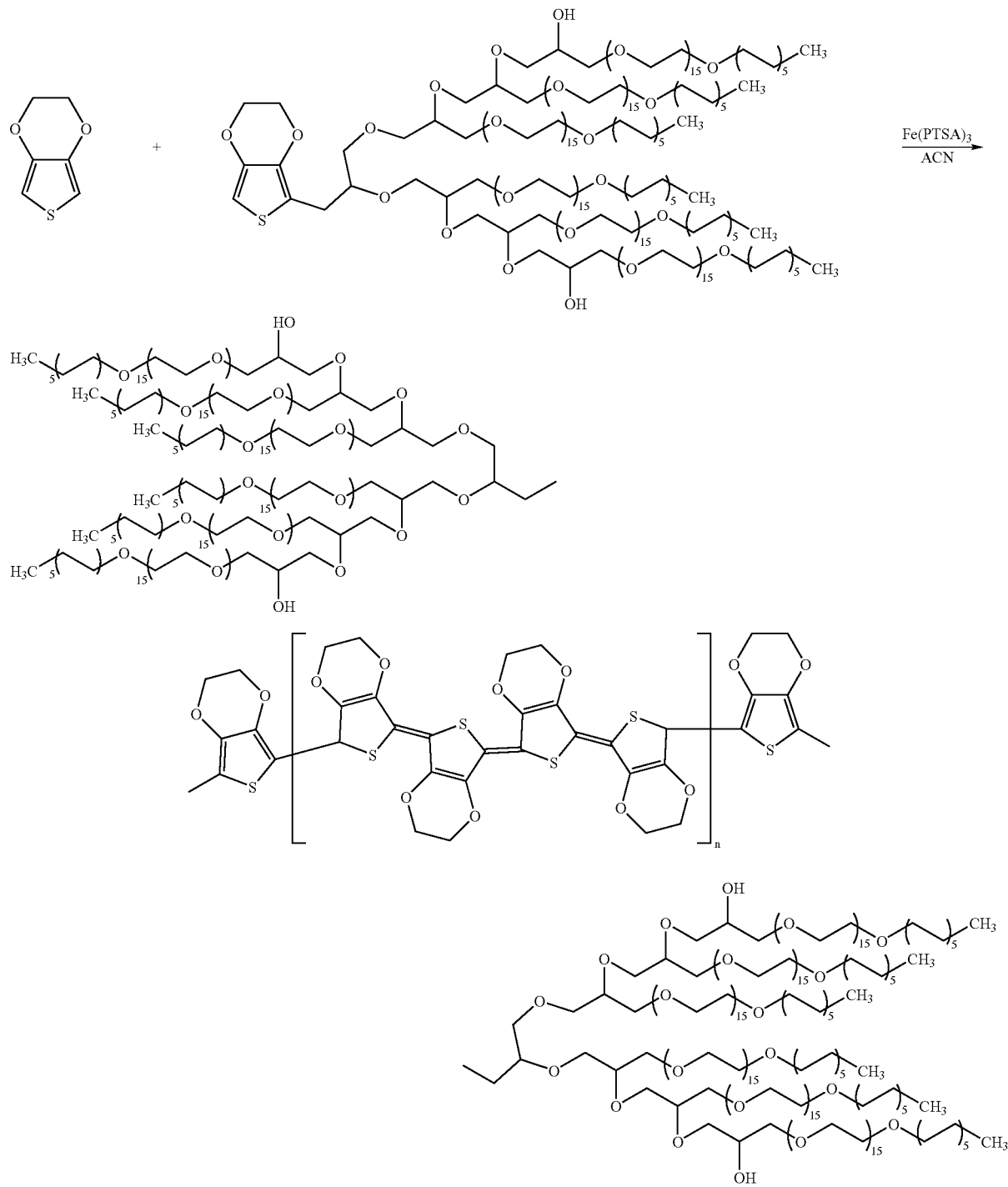

We claim:
1. An ABA triblock copolymer wherein:
a) the "B" block is an oligomer or polymer of heteroaromatic monomers, and
b) the "A" block is an end-cap that is non-conjugated and non-electrically conducting, and
c) the end-cap contains at least one branch wherein the end cap "A" block comprises:

a heteroaromatic ring, and a branched, non-conjugated, non-electrically conductive group attached to the heteroaromatic ring at a position adjacent the heteroatom in the heteroaromatic ring, and wherein the branched group has a structure selected from the group consisting of:

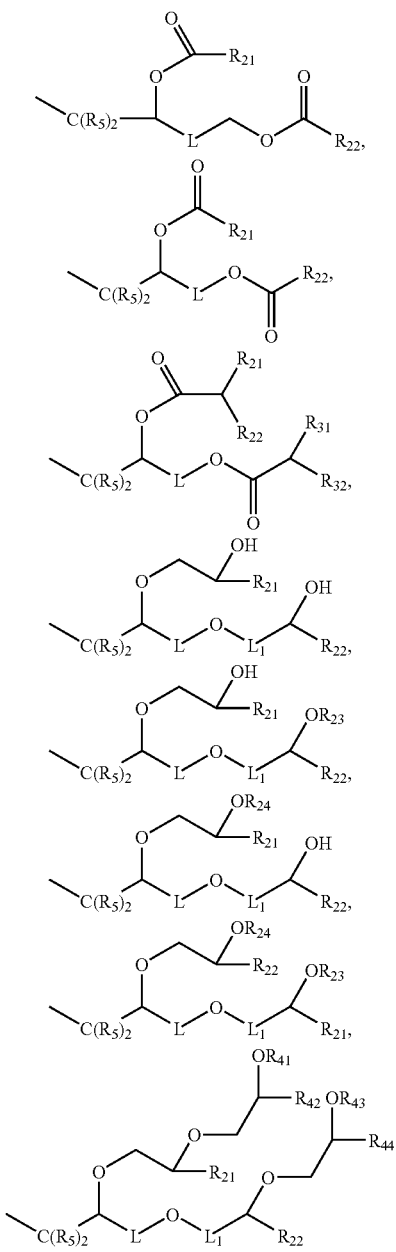

and salts thereof;

wherein each of $R_{21}$, $R_{22}$, $R_{23}$, $R_{24}$, $R_{31}$, $R_{32}$, $R_{41}$, $R_{42}$, $R_{43}$, and $R_{44}$, independently of one another and independent of other R groups in the molecule, are hydrogen, deuterium, alkyl, alkenyl, alkoxy, aryl, phenyl, carboxylate, alkylcarbonyl, akanoyl, alkylthio, cycloalkyl, cycloalkoxy, alkyloxy, alkenyloxy, alkenyldioxy, aryl, alkylaryl, arylalkyl, aryloxy, amino, alkylamino, dialkylamino, alkylcarbonylamino, alkylsulfinyl, aryloxyalkyl, alkoxyalkyl, polyetheralkyl, phosphate, phosphite, phosphine, hydroxyl, cyano, sulfonate, alkylsulfonate, arylsulfonate, alkylsulfate, arylsulfate, nitroalkyl, alkylsilane, arylsilane, an oligomeric chain made by repeating one or more monomers, selected from glycols, ethers, fluoroethers, olefins, fluoroolefins, acrylates and methacrylates, vinyl groups, alkynes, esters, amino acids, lactones and lactams, urethanes, epoxies, hydroxyacids, dienes, chloroolefins, diols, diamines, polyamines, groups containing acrylates or methacrylates, groups containing esters, ethers, hydroxyls, epoxies or amines, epoxidized groups, ring-opened epoxy groups, polyglycols, polyethylene glycol, polyethers, poly(fluoroethers), polyacetals, polyolefins, polyenes, polystyrene and its copolymers, polyfluoroolefins, polyols, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitrile and its copolymers, polybutadiene and its copolymers, alkyds, polyalcohols, polyurethanes, epoxies, cellulose and its derivatives, starch and its derivatives, polypeptides, oligonucleotides, nucleotides, oligosaccharides, polysaccharides, and combinations and copolymers thereof;

$R_5$, independent of other $R_5$, is selected from the group consisting of hydrogen, optionally substituted alkyl, halogens, and all non-hydrogen functional groups that are stable to oxidative polymerization reaction conditions and which do not disrupt the oxidative polymerization reaction; and L and $L_1$ are independently selected from the group consisting of a single bond, and a linker between the indicated moieties which is selected from optionally substituted alkylene, methylene, linear alkylene, cyclic alkylene groups, alkenylene, and arylene groups, optionally substituted ether or polyether groups, and optionally substituted thioether or polythioether groups, where any substituents on the linker groups are not reactive under oxidative polymerization reaction conditions.

2. The ABA polymer of claim 1, wherein the heteroaromatic monomers of the "B" block are selected from pyrroles, thiophenes, selenophenes tellurophenes, furans, indoles, isoinoles, isothianaphthalenes, pyridines, pyrimidines, pyrazines, thienothiophenes, triazines, thiazoles, imidazoles, quinolines, isoquinolines, benzimidazoles, thiazoles, triazoles, oxidiazoles, benzopyrrolines, dithienobenzene, thianaphtene, carbazoles, benzothiophenes, isobenzothiophenes, benzofurans, isobenzofurans, isoindolines, isobenzoselenophenes isobenzotellurophenes, and their substituted derivatives.

3. The ABA triblock copolymer of claim 1, wherein the heteroaromatic monomers of the "B" block are selected from the group consisting of 3,4-ethylenedioxythiophene, thieno[3,4-b]thiophene, N-methylpyrrole, N-alkypyrrole, 3-methylpyrrole, 3-methoxypyrrole, thiophene, 3-methylthiophene, 3-hexylthiophene, 3-octylthiophene, 3-methoxyhiophene, 3,4-propylenedioxythiophene, 3,4-butylenedioxythiophene, 3,4-ethylenedioxypyrrole, and 3,4-propylenedioxypyrrole.

4. The ABA triblock copolymer of claim 3, wherein the heteroaromatic ring of the "A" block is selected from the group consisting of 3,4-ethylenedioxythiophene, thieno[3,4-b]thiophene, N-methylpyrrole, N-alkypyrrole, 3-methylpyrrole, 3-methoxypyrrole, thiophene, 3-methylthiophene, 3-hexylthiophene, 3-octylthiophene, 3-methoxyhiophene, 3,4-propylenedioxythiophene, 3,4-butylenedioxythiophene, 3,4-ethylenedioxypyrrole, and 3,4-propylenedioxypyrrole.

5. The ABA triblock copolymer of claim 1, wherein the heteroaromatic ring of the "A" block and the heteroaromatic rings of the heteroaromatic monomers of the "B" blocks are selected from the group consisting of thiophenes, pyrroles and their substituted derivatives.

6. The ABA triblock copolymer of claim 1, wherein the heteroaromatic ring of the "A" block and the heteroaromatic rings of the heteroaromatic monomers of the "B" blocks are selected from the group consisting of 3,4-ethylenedioxythiophene, thieno[3,4-b]thiophene, and pyrrole.

7. The ABA triblock copolymer of claim 1 which is intrinsically conducting.

8. The ABA triblock copolymer of claim 7 which has electrical conductivity of $10^{-6}$-$10^3$ S/cm, as measured by a four-point conductivity measurement technique.

9. The ABA triblock copolymer of claim 1 wherein the branched group is hyperbranched and has a structure selected from the group consisting of:

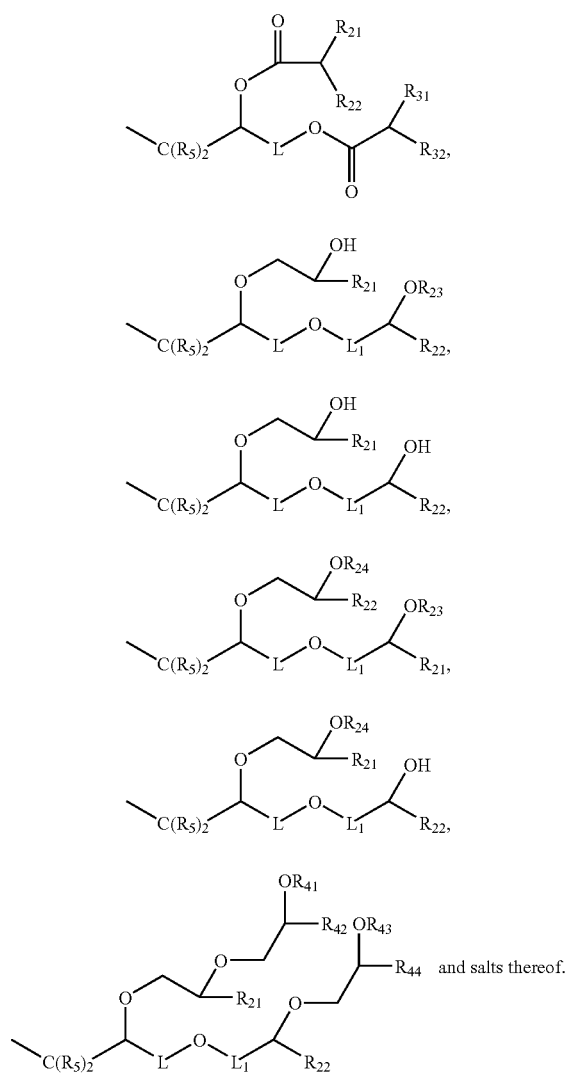

10. The ABA triblock copolymer of claim 1, where L and $L_1$ are a methylene and $R_5$ is hydrogen, and $R_{21}$, $R_{22}$, $R_{23}$, $R_{24}$, $R_{31}$, $R_{32}$, $R_{41}$, $R_{42}$, $R_{43}$, and $R_{44}$ independently of one another and independent of other R groups in the molecule, are linear and branched alkyl, alkenyl, aryl, poly(ethyleneglycol) oligomers, alkyl terminated poly(ethylene glycol)s, aryl terminated poly(ethylene glycol)s, poly(propyleneglycol) oligomers, poly(ethylene-co-propylene glycol) oligomers, alkyl terminated poly(ethylene-co-propylene glycol) oligomers, polyetheramines, polyesters oligomers, and polyfluoroethers.

11. The ABA triblock copolymer of claim 10, wherein the heteroaromatic monomers of the "B" block and the heteroaromatic rings of the "A" block are 3,4-ethylendioxythiophenes.

12. An electrically conducting thin film comprising an intrinsically conducting ABA triblock copolymer of claim 1.

13. The ABA triblock copolymer of claim 1 wherein the end-cap contains one to seven branches.

14. The ABA triblock copolymer of claim 1 wherein the branched group has the structure:

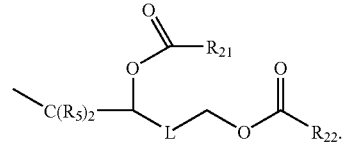

15. The ABA triblock copolymer of claim 14 wherein $R_{21}$ and $R_{22}$ are alkenyl groups.

16. The ABA triblock copolymer of claim 9, where L and $L_1$ are a methylene and $R_5$ is hydrogen, and $R_{21}$, $R_{22}$, $R_{23}$, $R_{24}$, $R_{31}$, $R_{32}$, $R_{41}$, $R_{42}$, $R_{43}$, and $R_{44}$ independently of one another and independent of other R groups in the molecule, are linear and branched alkyl, alkenyl, aryl, poly(ethyleneglycol) oligomers, alkyl terminated poly(ethylene glycol)s, aryl terminated poly(ethylene glycol)s, poly(propyleneglycol) oligomers, poly(ethylene-co-propylene glycol) oligomers, alkyl terminated poly(ethylene-co-propylene glycol) oligomers, polyetheramines, polyesters oligomers, and polyfluoroethers.

17. The ABA triblock copolymer of claim 9, wherein the heteroaromatic monomers of the "B" block and the heteroaromatic rings of the "A" block are thiophenes.

18. The ABA triblock copolymer of claim 1, wherein the heteroaromatic monomers of the "B" block are 3,4-ethylenedioxythiophenes.

19. An ABA triblock copolymer wherein:
a) the "B" block is an oligomer or polymer of heteroaromatic monomers, and
b) the "A" block is an end-cap that is non-conjugated and non-electrically conducting, and
c) the end-cap contains at least one branch, wherein the end-cap is hyperbranched and has the structure

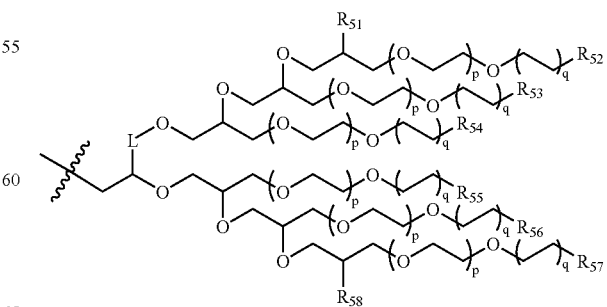

and salts thereof;

where each of $R_{51}$-$R_{58}$, independently of one another and independent of other R groups in the molecule, are hydrogen, deuterium, alkyl, alkenyl, alkoxy, aryl, phenyl, carboxylate, alkylcarbonyl, akanoyl, alkylthio, cycloalkyl, cycloalkoxy, alkyloxy, alkenyloxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, fluorine, fluorinated alkyl, sulfonate, alkylsulfonate, arylsulfonate, alkylsulfate, arylsulfate, nitroalkyl, alkylsilane, arylsilane, an oligomeric chain made by repeating one or more monomers selected from glycols, ethers, fluoroethers, olefins, fluoroolefins, acrylates and methacrylates, vinyl groups alkynes, esters, amino acids, lactones and lactams, urethanes, epoxies, hydroxyacids, dienes, chloroolefins, diols, diamines, polyamines, groups containing acrylates or methacrylates, groups containing esters, ethers, hydroxyls, epoxies or amines, epoxidized groups, ring-opened epoxy groups, polyglycols, polyethylene glycol, polyethers, poly(fluoroethers), polyacetals, polyenes, polyolefins, polystyrene and its copolymers, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers, polymers derived from the polymerization of unsaturated monomers, polyacrylates, polymethacrylates, polyacrylonitrile and its copolymers, polybutadiene and its copolymers, alkyds, polyols, polyalcohols, polyurethanes, epoxies, cellulose and its derivatives, starch and its derivatives, polypeptides, oligonucleotides, nucleotides, oligosaccharides, polysaccharides, and combinations and copolymers thereof;

L is a single bond or is a linker between the indicated moieties which can be selected from optionally substituted alkylene, methylene, linear alkylene, cyclic alkylene groups, alkenylene, and arylene groups, optionally substituted ether or polyether groups, optionally substituted thioether or polythioether groups, where any substituents on the linker groups are not reactive under oxidative polymerization reaction conditions; and p and q are numbers.

20. The ABA triblock copolymer of claim 19, wherein p and q range from 2 to 25.

21. The ABA triblock copolymer of claim 19 wherein $R_{51}$-$R_{58}$ are independently selected from H, OH, $NH_2$, optionally substituted alkyl, fluorinated alkyl, and fluorine.

22. An electrically conducting thin film comprising an intrinsically conducting ABA triblock copolymer of claim 19.

23. The ABA triblock copolymer of claim 19 where each of $R_{51}$-$R_{58}$, independently of one another and independent of other R groups in the molecule, are selected from the group consisting of hydrogen, deuterium, alkyl, alkenyl, alkoxy, aryl, phenyl, carboxylate, alkylcarbonyl, akanoyl, alkylthio, cycloalkyl, cycloalkoxy, alkyloxy, alkenyloxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitroalkyl, alkylsilane, arylsilane, fluorine, and fluorinated alkyl.

24. The ABA triblock copolymer of claim 19 where each of $R_{51}$-$R_{58}$ are selected from hydrogen, hydroxyl or alkyl.

25. The ABA triblock copolymer of claim 19 where L is a single bond or methylene.

26. An intrinsically conducting polymer or an intrinsically conducting oligomer that is terminated with one or more end-capping groups wherein an end-capping group comprises a heteroaromatic ring that is substituted with a branched, non-conjugated, non-electrically conductive group on the heteroaromatic ring at a position adjacent the heteroatom and wherein the end-capping group is a hyperbranched group having three to five branch points which are linked by linear or branched alkyl esters, the products of the ring opening of epoxy compounds, and alkyl terminated polyethylene glycol oligomers.

* * * * *